US008481646B2

(12) United States Patent
Weng et al.

(10) Patent No.: US 8,481,646 B2
(45) Date of Patent: *Jul. 9, 2013

(54) SOLUTION BLENDING PROCESS FOR PREPARING THERMOPLASTIC VULCANIZATES

(75) Inventors: Weiqing Weng, Houston, TX (US); Sunny Jacob, Seabrook, TX (US); Peijun Jiang, League City, TX (US); Armenag H. Dekmezian, Kingwood, TX (US); Aspy K. Mehta, Humble, TX (US); James R. Ayers, Highlands, TX (US); David J. Lohse, Bridgewater, NJ (US); Peter W. Manders, Hudson, OH (US); Palanisamy Arjunan, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,171

(22) Filed: Feb. 23, 2011

(65) Prior Publication Data

US 2012/0045600 A1 Feb. 23, 2012

Related U.S. Application Data

(62) Division of application No. 11/787,856, filed on Apr. 18, 2007, now Pat. No. 7,915,345.

(60) Provisional application No. 60/811,923, filed on Jun. 8, 2006.

(51) Int. Cl.
| | |
|---|---|
| C08F 8/00 | (2006.01) |
| C08L 9/00 | (2006.01) |
| C08L 25/02 | (2006.01) |
| C08L 33/04 | (2006.01) |
| C08L 33/10 | (2006.01) |

(52) U.S. Cl.
USPC ............ 525/191; 525/232; 525/240; 525/241

(58) Field of Classification Search
USPC ................................. 525/191, 232, 240, 241
See application file for complete search history.

(56) References Cited

U.S. PATENT DOCUMENTS

| | | | |
|---|---|---|---|
| 3,629,212 A | 12/1971 | Benedikter et al. | |
| 4,016,342 A | 4/1977 | Wagensommer | |
| 4,130,535 A | 12/1978 | Coran et al. | |
| 4,306,041 A | 12/1981 | Cozewith et al. | |
| 4,311,628 A | 1/1982 | Abdou-Sabet et al. | |
| 6,207,756 B1 | 3/2001 | Datta et al. | |
| 6,245,856 B1 | 6/2001 | Kaufman et al. | |
| 6,268,438 B1 | 7/2001 | Ellul et al. | |
| 6,319,998 B1 | 11/2001 | Cozewith et al. | |
| 6,388,016 B1 | 5/2002 | Abdou-Sabet et al. | |
| 6,498,214 B2 | 12/2002 | Laughner et al. | |
| 6,579,944 B1 | 6/2003 | Abdou-Sabet et al. | |
| 6,770,714 B2 | 8/2004 | Ommundsen et al. | |
| 7,585,917 B2 | 9/2009 | Datta et al. | |
| 7,928,164 B2 * | 4/2011 | Jiang et al. | 525/191 |
| 2003/0045638 A1 | 3/2003 | Qiao et al. | |
| 2004/0260001 A1 | 12/2004 | Lin et al. | |
| 2006/0293453 A1 | 12/2006 | Jiang et al. | |
| 2006/0293455 A1 | 12/2006 | Jiang et al. | |
| 2006/0293460 A1 | 12/2006 | Jacob et al. | |
| 2006/0293461 A1 | 12/2006 | Jiang et al. | |
| 2006/0293462 A1 | 12/2006 | Jacob et al. | |
| 2007/0015877 A1 | 1/2007 | Burkhardt et al. | |
| 2007/0284787 A1 | 12/2007 | Weng et al. | |

FOREIGN PATENT DOCUMENTS

| | | |
|---|---|---|
| EP | 770 106 | 11/1996 |
| EP | 837 098 | 1/1997 |
| EP | 930 337 | 3/2004 |
| EP | 1 605 015 | 12/2005 |
| EP | 1 655 332 | 5/2006 |
| EP | 1 688 459 | 8/2006 |
| GB | 164 770 | 6/1921 |
| GB | 1 380 884 | 1/1975 |
| GB | 1 599 164 | 9/1981 |
| GB | 2 273 504 | 6/1994 |
| WO | WO 98/27154 | 6/1998 |
| WO | WO 02/33003 | 4/2002 |
| WO | WO 2005/010094 | 2/2005 |
| WO | WO 2005/028556 | 3/2005 |
| WO | WO 2006/118674 | 11/2006 |

OTHER PUBLICATIONS

Wu, Souheng, *Phase Structure in Polymer Blends: a Criterion for Rubber Toughening*, Polymer, vol. 26, No. 12, pp. 1855-1863, 1985.

* cited by examiner

Primary Examiner — Nathan M Nutter

(74) Attorney, Agent, or Firm — Darryl M. Tyus

(57) ABSTRACT

This invention relates to the preparation of thermoplastic vulcanizates (TPVs) with unique morphological features, more specifically, this invention relates to a method for preparing TPV compositions wherein the mixing of plastomers and elastomers are carried out in solvent with curatives to induce cross-linking.

20 Claims, No Drawings

SOLUTION BLENDING PROCESS FOR PREPARING THERMOPLASTIC VULCANIZATES

CROSS-REFERENCE TO RELATED APPLICATIONS

This application is a divisional application of U.S. Ser. No. 11/787,856 filed Apr. 18, 2007 now U.S. Pat. No. 7,915,345. This application claims priority to U.S. Ser. No. 60/811,923, filed Jun. 8, 2006, and is related to U.S. Ser. No. 60/693,030, filed Jun. 22, 2005, U.S. Ser. No. 11/296,842, filed Dec. 7, 2005, U.S. Ser. No. 11/296,830, filed Dec. 7, 2005, U.S. Ser. No. 11/295,927, filed Dec. 7, 2005, U.S. Ser. No. 11/295,930, filed Dec. 7, 2005, and U.S. Ser. No. 60/699,663, filed Jul. 15, 2005. All of which applications are incorporated by reference in their entireties.

FIELD OF THE INVENTION

This invention relates to the production of thermoplastic vulcanizates (TPVs) in solution processes, and the TPV's formed therein.

BACKGROUND OF THE INVENTION

It would be beneficial to the TPV industry to have a TPV with ultra-fine morphology while still maintaining or preferably exceeding the desirable properties of the dynamic vulcanization in an extruder as mentioned above. It would also be advantageous for the TPV production to be performed in conjunction with the elastomer production without the need to finish and re-dissolve the elastomers. This invention addresses these needs.

GB Patent 1,599,164 discusses the blending of polypropylene (PP) and EPDM in solution. There is no mention of the addition of curatives to enhance physical properties.

A process for producing TPVs is disclosed in U.S. Pat. No. 6,388,016, in which a polymer blend is produced by solution polymerization in series reactors employing metallocene catalysts and the resultant blend is subjected to dynamic vulcanization.

U.S. Pat. No. 6,245,856 describes the use of a compatibilizer in a PP/EPDM thermo plastic olefin (TPO). In the absence of a compatibilizer, the elastomer dispersion is uneven, with some particles greater than 5 micrometers in size. In the presence of the compatibilizer, the dispersion displayed a particle size of about 1 micrometer.

U.S. Pat. No. 6,579,944 discloses a PP/EPDM based TPV composition with a majority of the particles less than 5 micrometers in size, some as large as 10 micrometers, others less than 0.1 micrometers.

U.S. Pat. No. 4,311,628 provides an example of a PP/EPDM based TPV having an EPDM content of 85% by weight. The disclosure states that the TPV is processable as a thermoplastic polymer.

U.S. Pat. No. 6,498,214 discloses thermoplastic polyolefin blend compositions useful for soft touch TPO applications which comprise, in weight percent based upon the weight of components A and B. A is about 99 to about 1 percent of at least one polypropylene homopolymer or copolymer; and B is about 99 to about 1 percent of at least one homogeneously branched ethylene/alpha-olefin copolymer in which the alpha-olefin contains at least 4 carbon atoms and the homogeneously branched copolymer has a crystallinity of less than about 3 percent.

U.S. Ser. No. 60/693,030 filed Jun. 22, 2005, discloses a heterogeneous polymer blend.

Other references of interest include: U.S. Pat. No. 3,629,212, U.S. Pat. No. 4,016,342, U.S. Pat. No. 4,306,041, U.S. Pat. No. 6,245,856, U.S. Pat. No. 6,207,756, U.S. Pat. No. 6,319,998, U.S. Pat. No. 6,770,714,U.S. Pat. No. 4,130,535, U.S. Pat. No. 4,311,628, U.S. Pat. No. 6,388,016, and Wu, Souheng, *Phase Structure in Polymer Blends: a Criterion for Rubber Toughening*, POLYMER, (1985) 26 (12), 1855-63.

In addition, this invention is related to U.S. Ser. No. 60/693,030, filed Jun. 22, 2005, U.S. Ser. No. 11/296,842, filed Dec. 7, 2005, U.S. Ser. No. 11/296,830, filed Dec. 7, 2005, U.S. Ser. No. 11/295,927, filed Dec. 7, 2005, U.S. Ser. No. 11/295,930, filed Dec. 7, 2005, U.S. Ser. No. 60/699,663, filed Jul. 15, 2005.

SUMMARY OF THE INVENTION

This invention relates to a process to prepare a thermoplastic vulcanizate (TPV) comprising: contacting a thermoplastic polymer, a cross-linkable elastomeric polymer, at least one curative, and at least one cure activator with a solvent, curing the cross-linkable elastomeric polymer, and optionally removing the solvent.

DETAILED DESCRIPTION OF THE INVENTION

As used herein, "partially cross-linked" is defined to be when less than 95 weight % (preferably 10-95 weight %) of the rubber in the reactor is cross-linked, as determined by the xylene extraction test described in the Examples below.

As used herein, "fully cross-linked" is defined as when 95 weight % or greater of the rubber in the reactor is cross-linked, as determined by the xylene extraction test described in the Examples below.

As used herein the term "curative(s)," also referred to as "curing agent(s)," means any of the additives conventionally added to polymer blends to induce cross-linking of one or more components of the blend during a post-polymerization, dynamic vulcanization step.

As used herein, the term "cure activator" is defined to be, any materials that help to activate the curatives.

As used herein, the term "heterogeneous blend" means a composition having two or more morphological phases in the same state. For example a blend of two polymers where one polymer forms discrete packets dispersed in a matrix of another polymer is said to be heterogeneous in the solid state. Also a heterogeneous blend is defined to include co-continuous blends where the blend components are separately visible, but it is unclear which the continuous phase is and which is the discontinuous phase. Such morphology is determined using scanning electron microscopy (SEM) or atomic force microscopy (AFM). In the event the SEM and AFM provide different data, then the AFM data are used. By "continuous phase" it is meant the matrix phase in a heterogeneous blend. By "discontinuous phase" it is meant the dispersed phase in a heterogeneous blend.

As used herein, the term "homogeneous blend" means a composition having two or more polymers mixed at molecular level. Such a homogeneous blend is typically achieved in a solution of polymer mixture where even the components are not miscible in solid and melt states. A "homogeneous blend" is also a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature (Tg), e.g., the $T_g$ would exist as a single, sharp transition temperature on a dynamic mechanical thermal analyzer (DMTA) trace of tan δ (i.e., the ratio of the loss modulus to the storage modulus) versus temperature. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous.

The term "homogeneous solution blend" refers to a mixture of at least two polymers in a solvent, preferably a hydrocarbon solvent. The polymers are completely dissolved and mixed at the molecular level. The solvent could be a single hydrocarbon or a mixture of two or more hydrocarbons.

For purposes of this invention and the claims thereto, the term "thermoplastic polymer" is defined to be any polymer having a melting point of at least 70° C. as measured by DSC as described herein.

For purposes of this invention and the claims thereto, the term "elastomer" is defined as all natural and synthetic rubbers, including those defined in ASTM D-1566.

For purposes of this invention and the claims thereto, the term "elastomeric polymer" is defined to mean any polymer having a heat of fusion of 45 J/g or less as measured by DSC as described herein.

For purposes of this invention and the claims thereto, the term "solvent" is defined to mean any hydrocarbon or mixture of hydrocarbons in which the polymers dissolve to form a homogenous solution.

For purposes of this invention and the claims thereto, the term "thermoplastic vulcanizate" or "TPV" is defined to mean a polymer blend of thermoplastic polymer and cross-linked or partially cross-linked rubber where there is a continuous and non-continuous phase and the thermoplastic polymer is the continuous phase.

For purposes of this invention and the claims thereto, the term "cross-linkable elastomeric polymer" is defined to be any elastomer having a free diene content of greater than 0.5 mole % as measured by proton NMR to determine unsaturated olefinic group at 120° C. and using 1,1,2,2-tetrachloroethance-$d_2$ as solvent. When the term elastomeric polymer is used herein it is presumed that the elastomeric polymer is a cross-linkable elastomeric polymer.

The term "dynamic vulcanization" refers to vulcanization or curing process for a rubber contained in a blend with a thermoplastic resin, wherein the rubber is cross-linked or vulcanized under conditions of high shear at a temperature above the melting point of the thermoplastic polymer. Dynamic vulcanization can occur in the presence of a processing oil, or the oil can be added post dynamic vulcanization, or both (i.e., some can be added prior to dynamic vulcanization and some can be added after dynamic vulcanization).

The term "solution vulcanization" refers to a vulcanization or curing process for a rubber contained in a homogeneous solution blend with a thermoplastic resin, wherein the rubber is cross-linked or vulcanized in solution under conditions that promote the cross-linking reaction. Solution vulcanization can occur in the presence of a processing oil, or the oil can be added post vulcanization, or both (i.e., some can be added prior to dynamic vulcanization and some can be added after dynamic vulcanization). The cross-linked rubber might separate out from the homogeneous solution as a separate phase.

Peak melting point (Tm), crystallization temperature (Tc), heat of fusion and crystallinity were determined using the following procedure. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the curves were measured and used to determine the heat of fusion and the degree of crystallinity. A value of 189 J/g was used as the heat of fusion for 100% crystalline polypropylene. The percent crystallinity is calculated using the formula, [area under the curve (Joules/gram)/B (Joules/gram)]*100, where B is the heat of fusion for the homopolymer of the major monomer component. The values for B are to be obtained from the *Polymer Handbook, Fourth Edition*, published by John Wiley and Sons, New York 1999. (A value of 189 J/g is to be used as the heat of fusion for 100% crystalline polypropylene and a value of 290 J/g is to be used as the heat of fusion for 100% crystalline polyethylene.)

The melting temperatures reported here are the peak melting temperatures from the second melt unless otherwise indicated. For polymers displaying multi-peak melting characteristics, the higher melting peak was taken as the principal melting point.

Tg was measured by ASTM E-1356.

Polymer samples for $^{13}$C-NMR spectroscopy were dissolved in $d_2$-1,1,2,2-tetrachloroethane and the spectra were recorded at 125° C. using a NMR spectrometer of 75 or 100 MHz. Polymer resonance peaks are referenced to mmmm=21.8 ppm for polypropylene. Calculations involved in the characterization of polymers by NMR follow the work of F. A. Bovey in "Polymer Conformation and Configuration" Academic Press, New York 1969 and J. Randall in "Polymer Sequence Determination, Carbon-13 NMR Method", Academic Press, New York, 1977. The percent of methylene sequences of two in length, % $(CH_2)_2$, were calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments were based on H. N. Cheng and J. A. Ewen, Makromol. Chem. 1989, 190, 1931.

Polymer samples for $^1$H-NMR spectroscopy were dissolved in $d_2$-1,1,2,2-tetrachloroethane and the spectra were recorded at 125° C. using a NMR spectrometer of 500 or 700 MHz. The spectra were plotted from 0 to 8 ppm, and referenced to tetramethylsilane at 0 ppm. The integrated signal between 4.1 and 5.9 ppm is used to calculated amount of unstaturation. It is then used as free diene content in cross-linkable elastomers.

The branching index (g') is measured using SEC with an on-line viscometer (SEC-VIS) and is reported as g' at each molecular weight in the SEC trace. The branching index (g') is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and α were measured values for linear polymers and should be obtained on the same SEC-DRI-LS- VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing $C_2$ to $C_{10}$ monomers is confirmed by—$^{13}$C-NMR using the method of Randall (Rev. Macromol. Chem. Phys., $C_{29}$ (2&3), p. 285-297). Linear character for $C_{11}$ and above monomers is confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard is desired for a polymer where the comonomer is $C_9$ or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticity as measured by $^{13}$C-NMR. The viscosity averaged g' was calculated using the following equation:

$$g'_{vis} = \frac{\sum C_i [\eta_i]_b}{\sum C_i K M_i^\alpha}$$

where $C_i$ is the polymer concentration in the slice i in the polymer peak, and $[\eta_i]_b$ is the viscosity of the branched polymer in slice i of the polymer peak, and $M_i$ is the weight averaged molecular weight in slice i of the polymer peak measured by light scattering, K and α are as defined above.

The Reynolds number (Re) of a fluid is a dimensionless ratio of inertial forces to viscous forces and is used to describe the flow of the fluid within a vessel. The Reynolds number is determined using the following equation:

$$Re = \frac{v_s L}{v}$$

wherein $v_s$ is the mean fluid velocity, L is the tube diameter of the reactor (cm) (equal to the diameter of the cross-section if the vessel is circular), v is kinematic viscosity of the fluid (in cm$^2$/sec) as measured by ASTM D-445 at the reactor temperature. $v_s$ (mean fluid velocity) equals (r)(3.14159)(revolutions per second of the mixer), where r is radius of the vessel. In the event that mixing is effected without a mixer, such as two flowing streams being used to create mixing, then the velocity of the entering fluids shall be averaged and used as the mean fluid velocity.

When the value of the Reynolds number is small (generally less than 2000), this indicates laminar, or smooth flow. When the value of the Reynolds number is large (generally greater than 4000), this indicates turbulent flow. Typically this occurs when there are random eddie currents, which is the swirling of a fluid and the reverse current created when the fluid flows past an obstacle, vortices and other flow fluctuations. As used herein, the term "mixing" is defined to be when the Reynolds number of the composition is at least 1000, preferably at least 2000, preferably at least 3000, preferably at least 10,000.

For purposes of this invention and the claims thereto when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers. In addition the term copolymer includes any polymer having two or more chemically distinct monomers, and encompasses interpolymers and block copolymers of two or more chemically distinct monomer types.

As used herein, the term "polypropylene" means a polymer made of at least 50 mole % (preferably at least 60 mole %, more preferably at least 70 mole %, more preferably at least 80 mole %, even more preferably at least 90 mole %, even more preferably at least 95 mole % or 100 mole %) propylene units and having less than 20 wt % ethylene units. As used herein, the term "polyethylene" means a polymer made of at least 50 mole % (preferably at least 60 mole %, more preferably at least 70 mole %, more preferably at least 80 mole %, even more preferably at least 90 mole %, even more preferably at least 95 mole % or 100 mole %) ethylene units and having less than 20 wt % propylene units.

For purposes of this invention and the claims thereto, an EP Rubber is defined to be a copolymer of ethylene and propylene, and optionally diene monomer(s), where the ethylene content is from 35 to 80 wt %, the diene content is 0 to 15 wt %, and the balance is propylene with a minimum propylene content of 20 wt %; and where the copolymer has a Mooney viscosity, ML(1+4) @ 125° C. (measured according to ASTM D-1646) of 15 to 100.

TPV Composition

This invention relates to blends comprising one or more thermoplastic polymers, one or more cross-linkable elastomer(s), curatives and cure activators, the blend having substantially uniform dispersion of thermoplastic polymers and elastomeric polymers. Substantially uniform dispersion of thermoplastic polymers as used herein means that the non-continuous phase thermoplastic particles are all about the same size, even though they may have different shapes.

This invention further relates to a polymer blend comprising a continuous phase comprising a semi-crystalline thermoplastic polymer, having a heat of fusion at least 30 J/g and a discontinuous phase comprising particles of a second polymer different from, and less crystalline with a heat of fusion less than 30 J/g, the first polymer dispersed within the continuous phase. The second polymer is preferably an elastomeric polymer. The dispersed particles preferably have an average particle size of less than 10 microns, preferably less than 7 microns, preferably less than 5 microns, preferably less than 3 microns, preferably less than 2 microns, more preferably less than 1 micron, and most preferably between about 50 nanometers and about 0.5 microns. In another embodiment, the average particle size distribution of the particles is narrow, meaning that at least 50% (preferably at least 60%, preferably at least 70%, preferably at least 80%) of the particles are within ±30% (preferably within ±25%, preferably within ±20%) of the mean particle size, as determined by AFM.

As used herein "average particle size" is defined to mean that measured by Atomic Force Microscopy (AFM), as discussed in the Examples section.

In another embodiment, the thermoplastic polymer to cross-linkable elastomer ratio is from about 20:80 to about 80:20, alternately from about 30:70 to about 70:30, and alternately from about 60:40 to about 40:60. In another embodiment, the composition comprises about 20 to about 75 wt % of cross-linkable elastomer, preferably about 30 to about 75 wt %, and preferably about 40 to about 65 wt %, based upon the weight of the elastomer and the thermoplastic polymer, with the balance of the blend made of thermoplastic polymer.

Thermoplastic Polymers

Preferred thermoplastic polymers are the polymers that can be melted by heat and then cooled without appreciable change in properties. Useful thermoplastic polymers typically include, but are not limited to, polyethylene, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, more preferably $C_3$ to $C_{10}$ alpha-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene and/or butene.

Useful blends of this invention include those comprising 10 to 80 wt % thermoplastic polymer, preferably 20 to 70 wt %, and more preferably 30 to 70 wt %, based upon the weight of the composition.

Preferred thermoplastic polymers are polypropylene and polyethylene and their alpha-olefin copolymers. Particularly suitable is isotactic polypropylene. Other preferred plastics include but are not limited to: polyamide resins (for illustration, not limitation: nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer), polyester resins (for illustration, not limitation: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters), polynitrile resins (for illustration, not limitation: polyacrylonitrile (PAN), polymethacrylonitrile, acrylonitrile-styrene copolymers (AS), methacrylonitrile-styrene copolymers, methacrylonitrile-styrene-butadiene copolymers), and polyvinyl resins (for illustration, not limitation: vinyl acetate (EVA), polyvinyl alcohol (PVA), vinyl alcohol/ethylene copolymer (EVOA), polyvinylidene chloride (PVDC), polyvinyl chloride (PVC), polyvinyl/polyvinylidene copolymer, polyvinylidene chloride/methacrylate copolymer).

Preferred olefin homopolymers and copolymers useful as thermoplastic polymers in this invention typically have one or more of the following properties:

1. an Mw of 30,000 to 2,000,000 g/mol preferably 50,000 to 1,000,000, more preferably 90,000 to 500,000, as measured by SEC as disclosed in WO 2004/014998 page 73; and or
2. an Mw/Mn of 1 to 40, preferably 1.6 to 20, more preferably 1.8 to 10, more preferably 1.8 to 3 as measured by GPC; and or
3. a Tm (second melt) of 100 to 250° C., preferably 110 to 200° C., preferably 115 to 185° C. preferably 120° C. to 175° C., more preferably 130° C. to 170° C., as measured by the DSC method described herein; and or
4. a glass transition temperature (Tg) of −40° C. to 200° C., preferably −20° C. to 180° C., more preferably −10° C. to 160° C. as measured by the DMTA method described herein; and or
5. a heat of fusion ($\Delta H_f$) of 180 J/g or less, preferably 20 to 150 J/g, more preferably 40 to 120 J/g as measured by the DSC method described herein; and or
6. a crystallization temperature (Tc) of 15 to 120° C., preferably 20 to 115° C., more preferably 25 to 110° C., preferably 60 to 145° C., as measured by the method herein; and or
7. a heat deflection temperature of 45 to 150° C., preferably 60 to 145° C., more preferably 75 to 140° C. as measured by ASTM D-648; and or
8. a percent crystallinity of at least 30%, preferably at least 40%, alternatively at least 50%, as measured by DSC as described herein; and or
9. a branching index (g') of about 0.5 to about 0.99, preferably about 0.5 to about 0.98, and more preferably about 0.6 to about 0.97, as measured by the method described herein.

In a preferred embodiment, the thermoplastic polymer is an olefin polymer (preferably a $C_2$ to $C_{20}$ homopolymer or copolymer, more preferably a $C_2$ to $C_8$ homopolymer or copolymer) having a melting point of 100° C. or more, preferably 110° C. or more, more preferably 120° C. or more, more preferably 130° C. or more, and most preferably between 100° C. and 180° C.

Also, suitable thermoplastic polymers may include copolymers of polyolefins with styrene, such as a styrene-ethylene copolymer. In one or more embodiments, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are homo-polypropylene, impact, and random copolymers of propylene with ethylene or the higher α-olefins, described above, or with $C_{10}$-$C_{20}$ diolefins. Preferably, the homo-polypropylene has a melting point of at least 130° C., for example at least 140° C. and preferably less than or equal to 160° C., a heat of fusion of at least 75 J/g, alternatively at least 80 J/g, as determined by DSC analysis, and weight average molecular weight (Mw) of at least 50,000, alternatively at least 100,000, alternatively at least 500,000. Comonomer contents for these propylene copolymers will typically be from 1 to about 30% by weight of the polymer, for example, See U.S. Pat. Nos. 6,268,438, 6,288,171, and 6,245,856. Copolymers available under the tradename VISTAMAXX™ (ExxonMobil) are specifically included. Blends or mixtures of two or more polyolefin thermoplastic polymers such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Preferred thermoplastic polymers include propylene homopolymers and copolymers, ethylene polymers and copolymers.

In a preferred embodiment, the thermoplastic polymer does not comprise monomer units comprising a heteroatom, or if it does, the heteroatom containing monomer unit is present at less than 0.5 weight %, preferably less than 0.1 weight %, and more preferably less than 0.05 weight %, based upon the weight of the polymer.

In one aspect of the invention, the thermoplastic polymer is selected from polypropylene homopolymer, polypropylene copolymers, and blends thereof. The homopolymer may be atactic polypropylene, isotactic polypropylene, syndiotactic polypropylene or blends thereof. The copolymer can be a random copolymer, a statistical copolymer, a block copolymer, and blends thereof. The method of making the polypropylene is not critical, as it can be made by slurry, solution, gas phase or other suitable processes, and by using catalyst systems appropriate for the polymerization of polyolefins, such as Ziegler-Natta-type catalysts, metallocene-type catalysts, other appropriate catalyst systems or combinations thereof. In a preferred embodiment the propylene polymers and/or the butene polymers are made by the catalysts, activators and processes described in U.S. Pat. No. 6,342,566, U.S. Pat. No. 6,384,142, WO 03/040201, WO 97/19991 and U.S. Pat. No. 5,741,563. Such catalysts are well known in the art, and are described in, for example, *Ziegler Catalysts* (Gerhard Fink, Rolf Mülhaupt and Hans H. Brintzinger, eds., Springer-Verlag 1995); Resconi et al., *Selectivity in Propene Polymerization with Metallocene Catalysts,* 100 Chem. Rev. 1253-1345 (2000); and *I, II Metallocene-based Polyolefins* (Wiley & Sons 2000).

The thermoplastic polymer may be a propylene homopolymer. In one embodiment the propylene homopolymer has a molecular weight distribution (Mw/Mn) of up to 40, preferably ranging from 1.5 to 10, and from 1.8 to 7 in another embodiment, and from 1.9 to 5 in yet another embodiment, and from 2.0 to 4 in yet another embodiment. In another embodiment the propylene homopolymer has a Gardner impact strength, which is measured as described in WO 2004/014998, page 49, tested on 0.125 inch (about 0.32 cm) disk at 23° C., that may range from 20 in-lb to 1000 in-lb (about 0.14 to about 6.8 MPa) in one embodiment, and from 30 in-lb to 500 in-lb (about 0.21 to about 3.45 MPa) in another embodiment, and from 40 in-lb to 400 in-lb (about 0.28 to about 2.76 MPa) in yet another embodiment. In yet another embodiment, the 1% secant flexural modulus, determined as described in WO 2004/014998, page 78, may range from 100 MPa to 2300 MPa, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) (ASTM D-1238, 230° C., 2.16 kg) of preferred propylene polymers range from 0.1 dg/min to 2500 dg/min in one embodiment, and from 0.3 to 500 dg/min in another embodiment.

The polypropylene homopolymer or propylene copolymer useful in the present invention as the thermoplastic polymer may have some level of isotacticity. Thus, in one embodiment, a polyolefin comprising isotactic polypropylene is a useful polymer in the invention, and similarly, highly isotactic polypropylene is useful in another embodiment. As used herein, "isotactic" is defined as having at least 10% isotactic pentads according to analysis by $^{13}$C-NMR as described herein. As used herein, "highly isotactic" is defined as having at least 60% isotactic pentads according to analysis by $^{13}$C-NMR. In a desirable embodiment, a polypropylene homopolymer having at least 85% isotacticity is the polyolefin, and at least 90% isotacticity in yet another embodiment.

In another desirable embodiment, a polypropylene homopolymer having at least 85% syndiotacticity is the thermoplastic polymer, and at least 90% syndiotacticity in yet another embodiment. As used herein, "syndiotactic" is defined as having at least 10% syndiotactic pentads according to analysis by $^{13}$C-NMR as described herein. As used herein, "highly syndiotactic" is defined as having at least 60% syndiotactic pentads according to analysis by $^{13}$C-NMR.

Preferred propylene polymers that are useful in this invention as the thermoplastic polymers include those sold under the tradenames ACHIEVE™ and ESCORENE™ by ExxonMobil Chemical Company in Houston, Tex.

In another embodiment of the invention, the thermoplastic polymer is a propylene copolymer, either random, or block, of propylene derived units and units selected from ethylene and $C_4$ to $C_{20}$ α-olefin derived units, typically from ethylene and $C_4$ to $C_{10}$ α-olefin derived units in another embodiment. The ethylene or $C_4$ to $C_{10}$ α-olefin derived units are present from 0.1 wt % to 50 wt % of the copolymer in one embodiment, and from 0.5 to 30 wt % in another embodiment, and from 1 to 15 wt % in yet another embodiment, and from 0.1 to 5 wt % in yet another embodiment, wherein a desirable copolymer comprises ethylene and $C_4$ to $C_{20}$ α-olefin derived units in any combination of any upper wt % limit with any lower wt % limit described herein. The propylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 in yet another embodiment, wherein a desirable copolymer may comprise any upper molecular weight limit with any lower molecular weight limit described herein.

Particularly desirable propylene copolymers useful herein have a molecular weight distribution (Mw/Mn) ranging from 1.5 to 10, and from 1.6 to 7 in another embodiment, and from 1.7 to 5 in yet another embodiment, and from 1.8 to 4 in yet another embodiment. The Gardner impact strength, tested on a 0.125 inch (about 0.32 cm) disk at 23° C., of the propylene copolymer may range from 20 in-lb to 1000 in-lb (about 0.14 to about 6.8 MPa) in one embodiment, and from 30 in-lb to 500 in-lb (about 0.21 to about 3.45 MPa) in another embodiment, and from 40 in-lb to 400 in-lb (about 0.28 to about 2.76 MPa) in yet another embodiment. In yet another embodiment, the 1% secant flexural modulus of the propylene copolymer ranges from 100 MPa to 2300 MPa, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) of propylene copolymer ranges from 0.1 dg/min to 2500 dg/min in one embodiment, and from 0.3 to 500 dg/min in another embodiment.

In another embodiment the thermoplastic polymer may be a propylene copolymer comprising propylene and one or more other monomers selected from the group consisting of ethylene and $C_4$ to $C_{20}$ linear, branched or cyclic monomers, and in some embodiments is a $C_4$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from 0 to 40 wt %, more preferably from 0.5 to 30 wt %, more preferably from 2 to 30 wt %, more preferably from 5 to 20 wt %.

In a preferred embodiment, any propylene polymer having 0.01 to 5 weight % comonomer, a melting point preferably between 100 and 170° C., and an MFR of 200 dg/min or less may be used in the practice of this invention as the thermoplastic polymer. Suitable examples include polymers produced by Ziegler-Natta catalyst systems, metallocene systems, and the like. The polymers may be produced by any means including solution, slurry, gas phase, supercritical or high pressure. In a particularly preferred embodiment the propylene polymers useful herein have a molecular weight distribution (Mw/Mn) of 5 or less preferably between 1.5 and 4 preferably between 1.5 and 3. In another preferred embodiment, preferred propylene polymers useful herein as thermoplastic polymers include those produced by metallocene catalyst systems. In another embodiment preferred propylene polymers useful herein include those having a composition distribution breadth index (CDBI) of 60% or more, preferably 70% or more, preferably 80% or more, preferably 90% or more. (CDBI is measured as described in WO 93/03093, with the modification that any fractions having a weight average molecular weight (Mw) below 25,000 g/mol are disregarded.) Preferred propylene polymers that can be used in the practice of this invention as thermoplastic polymers include those propylene polymers sold by ExxonMobil Chemical Company under the tradename ACHIEVE™. Particularly useful grades include ACHIEVE™ 3854, ACHIEVE™ 1654E1, ACHIEVE™3825, ACHIEVE™1605, available from ExxonMobil Chemical Company in Houston, Tex. Additional preferred propylene polymers useful in the practice of this invention as thermoplastic polymers include those propylene homopolymers, and random copolymers available from ExxonMobil Chemical Company under the grade names: PP1024E4, PP1042, PP1032, PP1044, PP1052, PP1105E1, PP3155 and PP9852E1, PP9272, PP9513, PP9544, PP9562.

Elastomeric Polymer

Preferred cross-linkable elastomers are EPDM, Butyl rubber, halogenated butyl rubber, ethylene-propylene copolymers with ethylidene norbornene (ENB), ethylene-propylene copolymers with vinyl norbornene (VNB), styrene-butadiene rubber (SBR), polyisoprene (IR), nature rubber (NR), nitrile rubber (NBR), polybutadiene, or polychloroprene. The particularly suitable elastomer/rubber is EPDM.

Useful blends of this invention include those comprising 20 to 90 wt % partially cross-linked elastomeric polymer, preferably 30 to 80 wt %, and preferably 40 to 70 wt %, based upon the weight of total polymers.

Useful elastomeric polymers include any polymer having a heat of fusion less than 40 J/g as measured by DSC measurement, preferably less than 30 J/g, more preferably less than 20 J/g, more preferably less than 10 J/g, more preferably 0.01 J/g, more preferably between 0.01 and 35 J/g.

Preferred olefin homopolymers and copolymers useful as elastomeric polymers in this invention typically have one or more of the following properties:

1. an Mw of 30,000 to 2,000,000 g/mol preferably 50,000 to 1,000,000, more preferably 90,000 to 500,000, as measured by GPC; and/or
2. an Mw/Mn of 1 to 40, preferably 1.6 to 20, more preferably 1.8 to 10, more preferably 1.8 to 3 as measured by GPC; and/or
3. a Tm of less than 90° C., preferably less than 50° C., preferably less than 30° C., more preferably no melting temperature is observed as measured by the DSC method described herein; and/or
4. a glass transition temperature (Tg) of $-150°$ C. to 0° C., preferably $-100°$ C. to 0° C., more preferably $-70°$ C. to 0° C. as measured by the DMTA method described herein; and/or
6. a heat of fusion ($\Delta H_f$) of 50 J/g or less, preferably 0 to 40 J/g, more preferably 0 to 30 J/g as measured by the DSC method described herein; and/or
7. a Mooney viscosity (ML (1+4) at 125° C.) of 10 to 120, preferably 20 to 100, more preferably 30 to 80, as measured by ASTM D-1646.

Examples of preferred elastomeric polymers include, but are not limited to, ethylene propylene rubber, ethylene propylene diene monomer rubber, styrenic block copolymer rubbers (including SI, SIS, SB, SBS, SIBS and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

Particularly preferred elastomeric polymers for use herein include ethylene propylene rubber (EPR) and ethylene propylene diene monomer (EPDM) Rubbers.

Useful elastomeric polymers include ethylene, alpha-olefin, diene monomer (preferably 5-ethylidene-2-norbornene, 1,4-hexadiene, 1,6 octadiene, 5-methyl-1,4 hexadiene, 3,7-dimethyl-1,6-octadiene, vinyl norbornene or combinations thereof) elastomeric polymers containing ethylene in the range of from about 50 to about 90 mole percent ethylene, preferably in the range of from about 50 to about 70 mole percent, more preferably in the range of from about 50 to about 65 mole percent based on the total moles of the polymer. The ethylene, alpha-olefin, diene monomer elastomeric polymer contains, in range of from about 0.2 to about 5.0 mole percent of diene, preferably in the range of from about 0.3 to about 3.0 mole percent, more preferably in the range of from about 0.4 to about 2.5 mole percent, most preferably in the range of from about 0.4 to about 1.0 mole percent. The balance of the ethylene, alpha-olefin, diene monomer will generally be made up of an alpha-olefin, selected from the group of propylene, butene-1, hexene-1,4-methyl-1-pentene, octene-1, decene-1, and the like. The preferred alpha-olefins are propylene, hexene-1 and octene-1, most preferred is propylene. The alpha-olefins will be present in the elastomeric polymer, in the range of from about 10 to about 50 preferably from about 30 to 50, about more preferably from about 35 to about 50 mole percent. The elastomeric polymer will preferably have an ($Mw_{GPC,\ LALLS}$)/($Mn_{GPC,\ DRI}$) above about 6, preferably above about 8, more preferably above about 10, most preferably above about 15.

The elastomeric polymer will preferably have a Mooney viscosity ML (1+4) 125° C. generally in the range of from about 20 to about 120 MU, preferably in the range of from about 30 to about 100 MU, more preferably in the range of from about 50 to about 100 MU, and most preferably in the range of from about 65 to about 100 MU.

In another embodiment the elastomer is also functionalized with an unsaturated acid or anhydride group. For example maleated EPR or maleated EPDM can be used as the elastomeric polymer.

In a preferred embodiment, the cross-linkable elastomer has a Mooney Viscosity ML (1+4) @ 125° C. of preferably at least about 40 MU, more preferably at least about 60 MU, more preferably at least about 70 MU and more preferably at least about 80 MU, as measured according to ASTM D-1646. An example of preferred cross-linkable elastomers of this embodiment would be Vistalon™3666 and Vistalon™7500, both available from ExxonMobil Chemical Company, Baytown, Tex., USA.

For more information on the properties of the various elastomers and their manufacture, see Morton, *Rubber Technology*, Van Nostrand Reinhold, London, England 1987.

In another embodiment, the cross-linkable elastomeric polymer is a random propylene polymer. Preferred random propylene polymers useful in the present invention have an average propylene content on a molar basis of from about 68 to 95 mol %, preferably from 70 mol % to about 92 mol %, more preferably from about 72 mol % to about 89 mol %, most preferably from about 75 mol % to about 87 mol %. The balance of the random propylene polymer may be one or more alpha-olefins from 4 to 8 carbon atoms as specified above, preferably ethylene, and/or one or more diene monomers.

Preferably, the random propylene polymer comprises about 5 to 32 mol %, of a $C_2$ and/or a $C_4$-$C_{20}$ olefin more preferably 8 to 30 mol %, more preferably about 11 to about 28 mol %, with about 13 to 25 mol % being still more preferred.

The random propylene polymer may have a weight average molecular weight (Mw) of 5,000,000 or less, a number average molecular weight (Mn) of about 3,000,000 or less, a z-average molecular weight (Mz) of about 5,000,000 or less, and a g' index of 0.5 to 0.99 measured at the weight average molecular weight (Mw) of the polymer using isotactic polypropylene as the baseline, all of which may be determined by size exclusion chromatography, e.g., 3D SEC, also referred to as GPC-3D as described herein.

In another embodiment, the random propylene polymer may have a weight average molecular weight (Mw) of 5,000,000 or less, a number average molecular weight (Mn) of about 3,000,000 or less, a z-average molecular weight (Mz) of about 5,000,000 or less, and a g' index of 0.99 or less measured at the weight average molecular weight (Mw) of the polymer using isotactic polypropylene as the baseline, all of which may be determined by size exclusion chromatography, e.g., 3D SEC, also referred to as GPC-3D as described herein.

In a preferred embodiment, the random propylene polymer may have a Mw of about 5,000 to about 5,000,000 g/mole, more preferably a Mw of about 10,000 to about 1,000,000, more preferably a Mw of about 20,000 to about 500,000, more preferably 30,000 to 500,000, more preferably a Mw of about 50,000 to about 300,000, wherein Mw is determined as described herein.

In a preferred embodiment, the random propylene polymer may have a Mn of about 5,000 to about 3,000,000 g/mole, more preferably a Mn of about 10,000 to about 1,000,000, more preferably a Mn of about 20,000 to about 500,000, more preferably 30,000 to 500,000, more preferably a Mn of about 50,000 to about 200,000, wherein Mn is determined as described herein.

In a preferred embodiment, the random propylene polymer may have a Mz of about 10,000 to about 5,000,000 g/mole, more preferably a Mz of about 50,000 to about 1,000,000, more preferably a Mz of about 80,000 to about 500,000, more preferably a Mz of about 100,000 to about 300,000, wherein Mz is determined as described herein.

The molecular weight distribution index (MWD=(Mw/Mn)) of the random propylene polymer may be about 1.5 to 40.0, more preferably about 1.8 to 5 and most preferably about 1.8 to 3. Techniques for determining the molecular weight (Mn and Mw) and molecular weight distribution (MWD) may be found in U.S. Pat. No. 4,540,753 (Cozewith, Ju and Verstrate) and references cited therein and in *Macromolecules*, 1988, volume 21, p 3360 (Verstrate et al.).

In a preferred embodiment, the random propylene polymer may have a g' index value of 0.5 to 0.99 when measured, as described herein, at the Mw of the polymer using the intrinsic viscosity of isotactic polypropylene as the baseline.

In another preferred embodiment, the random propylene polymer may have a g' index value of 0.99 or less when measured, as described herein, at the Mw of the polymer using the intrinsic viscosity of isotactic polypropylene as the baseline.

In a preferred embodiment, the random propylene polymer may have a crystallization temperature (Tc) measured with differential scanning calorimetry (DSC) of about 200° C. or less, and more preferably 150° C. or less.

In a preferred embodiment, the random propylene polymer may have a density of about 0.85 to about 0.92, more preferably about 0.87 to 0.90 g/ml, and more preferably about 0.88 to about 0.89 g/ml at room temperature (about 23° C.) as measured per the ASTM D-1505 test method.

In a preferred embodiment, the random propylene polymer may have a melt flow rate (MFR), greater than or equal to 0.2 g/10 min, preferably between 2-500 g/10 min and more preferably between 20-200 g/10 min, preferably 20 to 200 g/10 min as measured according to the ASTM D-1238 test method.

In a preferred embodiment, the random propylene polymer may have a heat of fusion (Hf) determined according to the procedure described in ASTM E-794-85, which is greater than or equal to about 0.0 to about 0.5 Joules per gram (J/g), and is less than or equal to about 70 J/g, preferably less than or equal to about 50 J/g, preferably less than or equal to about 35 J/g, and more preferably less than or equal to about 25 J/g. Preferably the random propylene polymers also have a heat of fusion that is greater than or equal to about 1 J/g, preferably greater than or equal to about 2.5 J/g, and more preferably greater than or equal to about 5 J/g, according to the procedure described in ASTM E-794-85.

For use herein, the crystallinity of the random propylene polymer can also be expressed in terms of percentage of crystallinity as determined according to the DSC procedure described herein. The thermal energy for the highest order of polypropylene is estimated at 189 J/g (i.e., 100% crystallinity is equal to 189 J/g.). In a preferred embodiment, the propylene polymer has a % crystallinity of from about 0.0% to about 40%, preferably about 0.5% to about 40%, more preferably about 1% to about 30%, and most preferably about 5% to about 25%, wherein % crystallinity is determined according to the DSC procedure described herein. For use herein, the crystallinity of the random propylene polymer can also be expressed in terms of percentage of crystallinity. The thermal energy for the highest order of polypropylene is estimated at 189 J/g (i.e., 100% crystallinity is equal to 189 J/g.). In another embodiment, the random propylene polymer of the present invention preferably has a crystallinity of less than 40%, preferably about 0.25% to about 25%, more preferably from about 0.5% to about 22%, and most preferably from about 0.5% to about 20%.

In addition to this level of crystallinity, the random propylene polymer preferably has a single broad melting transition. However, random propylene polymer may show secondary melting peaks adjacent to the principal peak, but for purposes herein, such secondary melting peaks are considered together as a single melting point, with the highest of these peaks being considered the melting point of the random propylene polymer. The random propylene polymer preferably has a melting point of from about 25° C. to about 105° C., preferably about 25° C. to about 85° C., and more preferably about 30° C. to about 70° C. Alternately, the random propylene polymer may have a melting point of from about 25 to 105° C., preferably from 25° C. to about 85° C., preferably from 25° C. to about 75° C., preferably about 25° C. to about 65° C., more preferably about 30° C. to about 80° C., and more preferably about 30° C. to about 60° C.

Preferred random propylene polymer may have a Mooney viscosity ML (1+4)@125° C., as determined according to ASTM D-1646, of less than 100 MU, more preferably less than 75 MU, even more preferably less than 60 MU, and most preferably less than 30 MU.

Useful random propylene polymers preferably have an MFR (melt flow rate) of 0.5 to 200, preferably from 1 to 100 or more preferably 1 to about 50 (as measured by ASTM D-1238, 2.16 kg. at 230° C. with a 1 minute preheat on the sample to provide a steady temperature for the duration of the experiment).

Preferred random propylene polymers used in embodiments of the present invention have a ratio of m to r (m/r) of more than 1. The propylene tacticity index, expressed herein as "m/r", is determined by $^{13}$C-NMR. The propylene tacticity index m/r is calculated as defined in H. N. Cheng, *Macromolecules,* 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the preferred random propylene polymer has an isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred random propylene polymer useful in this invention have an mm triad tacticity index of three propylene units, as measured by $^{13}$C-NMR, of 75% or greater, 80% or greater, 82% or greater, 85% or greater, or 90% or greater. The mm triad tacticity index of a polymer is the relative tacticity of a sequence of three adjacent propylene units, a chain consisting of head to tail bonds, expressed as a binary combination of m and r sequences. It is usually expressed for semi-amorphous copolymers of the present invention as the ratio of the number of units of the specified tacticity to all of the propylene triads in the copolymer. The mm triad tacticity index (mm fraction) of a propylene copolymer can be determined from a $^{13}$C-NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

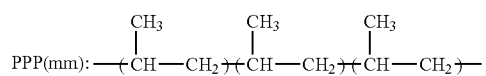

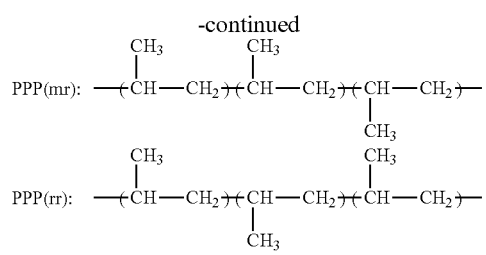

The $^{13}$C-NMR spectrum of the propylene copolymer is measured as described in U.S. Pat. No. 5,504,172 and U.S. Pat. No. 6,642,316 (column 6, line 38 to column 9, line 18). The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350 or an article in the journal Macromolecules, 17, (1984), 1950 (In the event of a conflict between the Polymer article and the Macromolecules article, the Polymer article shall control). In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the mm triad tacticity index is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the mm triad tacticity index of the propylene unit chain consisting of head-to-tail bonds can be determined.

For further information on how the mm triad tacticity can be determined from a $^{13}$C-NMR spectrum of the polymer, as described by J. A. Ewen, "Catalytic Polymerization of Olefins", (the Ewen method); and Eds. T. Keii, K. Soga; Kodanska Elsevier Pub.; Tokyo, 1986, P 271, and as described in detail in U.S. Patent Application 2004/054086 filed Mar. 18, 2004 on page 8, in numbered paragraphs [0046] to [0054], all of which are incorporated by reference herein.

In another embodiment polymers that are useful in this invention as random propylene polymers include homopolymers and random copolymers of propylene having a heat of fusion as determined by Differential Scanning calorimetry (DSC) of less than 70 J/g, an MFR of 50 dg/min or less, and contain stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 10 wt % to 25 wt % polymerized ethylene units, based on the total weight of the polymer; has a narrow intermolecular composition distribution (e.g. 75% or more); has a melting point (Tm) of from 25° C. to 120° C., or from 35° C. to 80° C.; has a heat of fusion within the range having an upper limit of 70 J/g to 25 J/g and a lower limit of about 0 to about 5 J/g, preferably about 1 to about 3 J/g; has a molecular weight distribution Mw/Mn of from 1.8 to 4.5; and has a melt flow rate of less than 40 dg/min, or less than 20 dg/min (as measured at 230° C., and 2.16 kg, ASTM D-1238).

A preferred random propylene polymer used in the present invention is described in detail as the "Second Polymer Component (SPC)" in co-pending U.S. application U.S. Ser. No. 60/133,966, filed May 13, 1999. Random copolymers of propylene are available commercially under the trade name Vistamaxx™ (ExxonMobil, Baytown Tex.). Suitable examples include: Vistamaxx™ 6100, Vistamaxx™ 6200 and Vistamaxx™ 3000.

In one embodiment, the random propylene polymer comprises a random propylene copolymer having a narrow compositional distribution. In another embodiment, the polymer is a random propylene copolymer having a narrow compositional distribution and a melting point as determined by DSC of from 25° C. to 110° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. The intramolecular composition distribution (i.e., blockiness) of the copolymer may be determined by $^{13}$C-NMR, which locates the comonomer residues in relation to the neighboring propylene residues. The intermolecular composition distribution of the copolymer is determined by thermal fractionation in a solvent. A typical solvent is a saturated hydrocarbon such as hexane or heptane. The thermal fractionation procedure is described below. Typically, approximately 75% by weight, preferably 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow compositional distribution if it meets the fractionation test described above. To produce a copolymer having the desired randomness and narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

In another embodiment, a random propylene polymer can be a blend of discrete polymers and/or copolymers. Such blends can include two or more polyethylene copolymers, two or more polypropylene copolymers, or at least one of each such polyethylene copolymer and polypropylene copolymer. Preferably, each of the random propylene polymers are described above and the number of random propylene polymers in a preferred embodiment may be three or less, more preferably two or less.

In an embodiment of the invention, the random propylene polymer may comprise a blend of two random propylene polymers differing in the olefin content. Preferably, one random propylene polymer may comprise about 7 to 13 mol % olefin, while the other random propylene polymer may comprise about 14 to 22 mol % olefin. In an embodiment, the preferred olefin in the random propylene polymers is ethylene.

Random propylene polymers can also be blended with processing oil and other common additives such as nucleating agents, antioxidants, fillers, nano-compositions, and the like, and may be fabricated into objects used in a variety of applications. Blends comprising random propylene polymers of this invention and other alpha-olefin polymers and copolymers, e.g., polypropylene, may also be fabricated into objects used in a variety of applications.

In a preferred embodiment, the propylene polymer may comprise a propylene based elastomeric polymer, produced by random polymerization processes leading to polymers having randomly distributed irregularities in stereoregular propylene propagation. This is in contrast to block copolymers in which constituent parts of the same polymer chains are separately and sequentially polymerized.

Preferred cross-linkable elastomeric polymers may also be produced by the continuous solution polymerization process described in WO 02/34795, advantageously in a single reactor and separated by liquid phase separation from the alkane solvent. Preferred semi-amorphous polymers may also be produced by the polymerization process described at page 6 lines 24-57 of EP 1 003 814 B1. Further detailed instructions on how to make such preferred semi-amorphous polymers can be found in WO 02/083754.

Preferred semi-amorphous polymers include VM™6100, VM™6200, and VM™3000 available from ExxonMobil Chemical Company in Houston, Tex.

In another embodiment, the elastomeric polymer is a plastomer. Plastomers that are useful in the present invention may be described as polyolefin copolymers having a density of from 0.85 to 0.915 g/cm$^3$ ASTM D-4703 Method B and ASTM D-1505—the first of these is compression molding at a cooling rate of 15° C./min and the second is the Gradient Density Column method for density determination and a melt index (MI) between 0.10 and 30 dg/min (ASTM D-1238; 190° C., 2.1 kg). In one embodiment, the useful plastomer is a copolymer of ethylene derived units and at least one of $C_3$ to $C_{10}$ α-olefin derived units, the copolymer having a density less than 0.915 g/cm$^3$. The amount of comonomer ($C_3$ to $C_{10}$ α-olefin derived units) present in the plastomer ranges from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

Plastomers useful in the invention as elastomeric polymers typically have a melt index (MI), (ASTM D-1238; 190° C., 2.1 kg) of between 0.10 and 20 dg/min in one embodiment, and from 0.2 to 10 dg/min in another embodiment, and from 0.3 to 8 dg/min in yet another embodiment. The average molecular weight of useful plastomers ranges from 10,000 to 800,000 in one embodiment, and from 20,000 to 700,000 in another embodiment. The 1% secant flexural modulus, measured as described in WO 2004/014998, page 28, of useful plastomers ranges from 10 MPa to 150 MPa in one embodiment, and from 20 MPa to 100 MPa in another embodiment. Further, the plastomer that is useful in compositions of the present invention typically has a melting temperature (Tm) of from 30 to 80° C. (first melt peak) and from 50 to 125° C. (second melt peak) in one embodiment, and from 40 to 70° C. (first melt peak) and from 50 to 100° C. (second melt peak) in another embodiment.

Preferred plastomers useful in the present invention as elastomeric polymers may be metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm$^3$ in one embodiment. The molecular weight distribution (Mw/Mn) of desirable plastomers ranges from 1.5 to 5 in one embodiment, and from 2.0 to 4 in another embodiment. Examples of a commercially available plastomers are EXACT 4150, a copolymer of ethylene and 1-hexene, the 1-hexene derived units making up from 18 to 22 wt % of the plastomer and having a density of 0.895 g/cm$^3$ and MI of 3.5 dg/min (ExxonMobil Chemical Company, Houston, Tex.); and EXACT 8201, a copolymer of ethylene and 1-octene, the 1-octene derived units making up from 26 to 30 wt % of the plastomer, and having a density of 0.882 g/cm$^3$ and MI of 1.0 dg/min (ExxonMobil Chemical Company, Houston, Tex.).

Preferred solvents for use herein include toluene, xylenes, propane, butane, isobutene, pentane, hexane, cyclohexane, cyclopentane, heptane, octane, nonane, and decane.

Preferably, the rubber has a degree of cure where not more than 15 wt % of the rubber was extractable, preferably not more than 10 wt % of the rubber was extractable, and more preferably not more than 5 wt % of the rubber was extractable. The term fully vulcanized may refer to a state of cure such that the cross-link density is at least about $4 \times 10^{-5}$ and more preferably at least $7 \times 10^{-5}$ moles per milliliter of elastomer or that the elastomer is less than about 3% extractable by cyclohexane at 23° C.

The partially cross-linked polymers are formed by reaction between the elastomeric polymers and cross-linking reagents or curatives. The presence and amount of such cross-linked polymers in the blend can be determined by a multi-step solvent extraction process. In this process, 10 grams of polymer are combined with 200 cc of cyclohexane and stirred for 24 hours at ambient temperature to dissolve the uncured and lightly branched elastomeric components of the blend. The cyclohexane solution is then filtered (glass fiber filter of 0.3 micron pore size) to obtain a supernatant and a solid. The supernatant is then vacuum-dried for 12 hours at about 80° C. The remaining material is uncross-linked elastomer. The solid is then placed in a beaker and contacted with 200 cc of xylene. The combination is then heated to the boiling temperature of xylene, stirred, refluxed for 24 hours, and filtered. The solid is washed once with 50 cc of xylene, and then dried with a vacuum for 8 hours at 100° C. The remaining insoluble solids are weighed and represent the fully cross-linked elastomer. For the purposes of this disclosure, cross-linkable elastomer is defined to include the fully cross-linked elastomer and the partially cross-linked elastomer, as measured in the test above.

Curatives

In another embodiment the compositions of this invention may be cured using radiation, such as ultra-violet and/or electron beam.

Useful curatives of this invention are those with an initiation temperature of 90° C. or more.

Preferred curatives are sulfur, sulfur donors, metal oxides, resin systems, such as phenolic resins, peroxide-based systems, hydrosilation with platinum or peroxide and the like, both with and without accelerators and co-agents.

Additionally, cure activators or cure accelerators may be used with the curatives. Suitable cure activators include, for example, sulfur compounds, metal oxide compounds, and any combinations thereof. Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally the entire available curative is consumed in the formation of effective cross-links which join individual polymer chains to one another and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea. Curatives, accelerators and the cure systems of which they are a part that are useful with one or more cross-linkable polymers are well-known in the art. The cure system can be dispersed in a suitable concentration into the desired portion of the rubber component, the rubber component optionally containing one or more filler, extender and/or plasticizer by, e.g., mixing the rubber and the cure system components in a step prior to addition of the rubber-containing composition to the thermoplastic polymer using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization.

In one embodiment of the invention, at least one curing agent is typically present at about 0.1 to about 15 phr; alternatively at about 0.25 to about 10 phr.

Process

This invention also relates to various methods of preparing the TPV compositions described herein. Typically the thermoplastic polymer (such as any of those described above), the elastomeric polymer (such as any of those described above), the curatives (such as any of those described above), cure accelerators (such as any of those described above) and solvent (such as any of those described above) are combined such that the two polymers are dissolved in solution and heated such that the curatives and or cure accelerators partially or completely cure the elastomeric polymer. The components may be combined in any order or all at once. The elevated temperature is preferably 160° C. to 230° C., more preferably 180° C. to 200° C. in one embodiment; and 80° C. to 140° C., more preferably 100° C. to 120° C. in another embodiment.

In one embodiment, the thermoplastic polymer(s) and cross-linkable elastomeric polymer(s) are dissolved in a solvent to form a homogenous solution. Curatives are added to the mixture at an elevated temperature, with mixing to induce cross-linking of the cross-linkable elastomeric polymer.

In another embodiment, the thermoplastic polymer(s) are dissolved in a solvent, and separately the elastomeric polymer(s) are dissolved in the same or different solvent, and then the solutions are combined. Curatives are added to the mixture at an elevated temperature, with mixing to induce cross-linking of the cross-linkable elastomeric polymer.

In another embodiment, the thermoplastic polymer(s) (such as a polypropylene) are discharged from a reactor as part of a solution (e.g. the reactor effluent is a solution of polymer, monomer and or solvent), the elastomeric polymer(s) are dissolved into this solution (e.g. the reactor effluent). Curatives are added to the mixture at an elevated temperature, with mixing to induce cross-linking of the cross-linkable elastomeric polymer.

In another embodiment, the thermoplastic polymer(s) (such as a polypropylene) are discharged from a reactor as part of a solution (e.g. the reactor effluent is a solution of polymer, monomer and or solvent), a solution of the elastomeric polymer(s) is combined with the first solution (e.g. the reactor effluent). Curatives are added to the mixture at an elevated temperature, with mixing to induce cross-linking of the cross-linkable elastomeric polymer.

In another embodiment, the elastomeric polymer(s) (such as an ethylene propylene diene momomer rubber) are discharged from a reactor as part of a solution (e.g. the reactor effluent is a solution of polymer, monomer and or solvent), the thermoplastic polymer(s) are dissolved into this solution (e.g. the reactor effluent). Curatives are added to the mixture at an elevated temperature, with mixing to induce cross-linking of the cross-linkable elastomeric polymer.

In another embodiment, the elastomeric polymer(s) (such as an ethylene propylene diene momomer rubber) are discharged from a reactor as part of a solution (e.g. the reactor effluent is a solution of polymer, monomer and/or solvent), a solution of the thermoplastic polymer(s) is combined with the first solution (e.g. the reactor effluent). Curatives are added to the mixture at an elevated temperature, with mixing to induce cross-linking of the cross-linkable elastomeric polymer.

In another embodiment, the elastomeric polymer(s) (such as an ethylene propylene diene momomer rubber) are discharged from a reactor as part of a solution (e.g. the reactor effluent is a solution of elastomeric polymer, monomer and or solvent). Likewise the thermoplastic polymer(s) (such as a polypropylene) are discharged from a reactor as part of a solution (e.g. the reactor effluent is a solution of thermoplastic polymer, monomer and or solvent). The two solutions (e.g. both reactor effluents) are combined. Curatives are added to the mixture at an elevated temperature, with mixing to induce cross-linking of the cross-linkable elastomeric polymer.

In another embodiment, the polymer blend is made in-situ. For example, a first polymer (either the thermoplastic polymer of the elastomeric polymer) is made in solution in a first reactor. The effluent from this reactor is then fed into a second reactor where the other polymer (either the elastomeric polymer or the thermoplastic polymer, respectively) is made, then the solution containing both polymers is contacted with curatives at an elevated temperature, with mixing to induce cross-linking of the cross-linkable elastomeric polymer.

The components of this invention may be combined in any vessel that allows production of a solution, including but not limited to batch reactors, loop reactors, continuous stir tank reactors (CSTR), and contactor reactors.

In an embodiment of this invention, while in the reactor, the Reynolds number of the composition is preferably greater than 2000, more preferably greater than 2500, more preferably greater than 3000, and most preferably greater than 4000.

In another embodiment, the methods above are used to produce a polymer blend that has the curative present but the curative has not been subjected to sufficient heat to cure the cross-linkable elastomeric polymer. Instead this polymer is finished (i.e. the solvent is removed) and optionally and stored or transported. Thereafter the polymer blend is formed into the desired shape (such as a molded article or a film) and heated to effect cure.

In another embodiment, partially cross-linked in-reactor TPV is later cured. In a preferred embodiment it is later cured with SiH.

Useful solvents of this invention include those having boiling points, as measured by ASTM D-86, of at least about 100° C., more preferably at least about 120° C., and more preferably at least about 150° C. Suitable solvents include hydrocarbons such as: hexane, heptane, toluene, xylene, cyclohexane, pentane, cyclopentane, decene, benzene, octane and nonane. In an embodiment, a suitable solvent is tetrahydrofuran (THF).

In one embodiment, the elastomers are preferably cross-linked through mixing procedure. Preferable mixing procedures include continuous stir tank reactor mixing and high-shear reactor mixing of a homogeneous solution of polymer blend in hydrocarbon solvents This novel solution curing will produce more uniform dispersion of plastics and elastomers, as well as more uniform cross-linking of elastomers.

Polymer Finishing Step

After polymerization, the polymer may be further finished. Finishing may include further curing, addition of additives, packaging, and shaping into desirable end use articles by any suitable means known in the art.

Additives

The homogeneous polymer blend according to the invention may optionally contain reinforcing and non-reinforcing fillers, plasticizers, antioxidants, stabilizers, rubber processing oils, extender oils, lubricants, anti-blocking agents, anti-static agents, wollastonite, talc, carbon black, silica, waxes, foaming agents, pigments, flame retardants and other processing aids known in the rubber compounding art. Such additives may comprise up to about 70 weight percent, more preferably up to about 65 weight percent, and more preferably about 1 to about 40 weight percent of the total composition. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The oils are selected from those ordinarily used in conjunction with the specific rubber or rubber component present in the composition.

The additives such as fillers and oils can be introduced into the homogeneous polymer blend. The additives can be added into the polymer blend after removal of solvent or diluent through melt blending.

Additional polymers can also be added to the TPV before or after cure to form blends. In one or more embodiments, the additional polymers include thermoplastic resins. Exemplary thermoplastic resins include crystalline and crystallizable polyolefins.

TPV Products

The TPV products of this invention generally have an elongation of about 150 to about 1000%, more preferably about 200 to about 800%, and more preferably about 210 to about 550%.

The TPV products of this invention generally have a 100% modulus of from about 2.0 to about 25 MPa, more preferably about 2.5 to about 20 MPa, and more preferably about 3.0 to about 15 MPa.

The TPV products of this invention generally have a tension set of about 5 to about 75%, more preferably about 10 to about 60%, and more preferably about 10 to about 50%.

The TPV products of this invention generally have an oil swell of about 150% or more, more preferably about 200% or more, and more preferably about 300% or more.

In another embodiment, the TPV products of this invention generally have an oil swell of about 300% or less, more preferably about 200% or less, and more preferably about 150% or less.

The TPV products of this invention also generally have a more even dispersion of the discontinuous phase. The TPV products of this invention also generally have a narrower particle size distribution. The TPV products of this invention also generally absorb more oil as is commercially desired in products such as a pad for under a car.

In one embodiment of this invention, the process further comprises recovering xylene precipitates, xylene insolubles, cyclohexane solubles, and xylene solubles.

In another embodiment, this invention relates to:
1. A process for preparing a thermoplastic vulcanizate (TPV) comprising:
   a. contacting a thermoplastic polymer having an Mw of 30,000 g/mol or more, a cross-linkable elastomer having an Mw or 30,000 g/mol or more, at least one curative, and at least one cure activator in a solvent to form Composition A;
   b. mixing Composition A and at least partially curing the cross-linkable elastomer in Composition A;
wherein the average particle size of the at least partially cured cross-linkable elastomer is 10 microns or less.
2. The process of paragraph 1 wherein the thermoplastic polymer is selected from the group consisting of: polypropylene, propylene ethylene copolymer, nylon, polystyrene, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, and combinations thereof.
3. The process of paragraphs 1 and 2 wherein the ratio of thermoplastic polymer to cross-linkable elastomer in Composition A is from about 20:80 to about 80:20.
4. The process of any of paragraphs 1-3 wherein Composition A is mixed at a temperature of at least about 80° C.
5. The process of any of paragraphs 1-4 wherein the cross-linkable elastomer is cured at a temperature of at least about 80° C.
6. The process of any of paragraphs 1-5 wherein Composition A comprises 10 to 80 wt % thermoplastic polymer, based upon the weight of the composition.
7. The process of any of paragraphs 1-6 wherein the thermoplastic polymer has an Mw of 50,000 to 1,000,000 g/mol.
8. The process of any of paragraphs 1-7 wherein the thermoplastic polymer has an Mw/Mn of 1 to 40.
9. The process of any of paragraphs 1-8 wherein the thermoplastic polymer has a Tm (second melt) of 100 to 200° C.
10. The process of any of paragraphs 1-9 wherein the thermoplastic polymer has a glass transition temperature (Tg) of −40° C. to 200° C.
11. The process of any of paragraphs 1-10 wherein the thermoplastic polymer has a heat of fusion ($\Delta Hf$) of about 180 J/g or less.
12. The process of any of paragraphs 1-11 wherein the thermoplastic polymer has a heat of fusion ($\Delta Hf$) of about 20 to about 150 J/g.
13. The process of any of paragraphs 1-12 wherein the thermoplastic polymer has a heat of fusion ($\Delta Hf$) of about 40 to about 120 J/g.
14. The process of any of paragraphs 1-13 wherein the thermoplastic polymer has a crystallization temperature (Tc) of about 15 to about 120° C.
15. The process of any of paragraphs 1-14 wherein the thermoplastic polymer has a heat deflection temperature of about 45 to 150° C.
16. The process of any of paragraphs 1-15 wherein the thermoplastic polymer has a percent crystallinity of at least about 30%.
17. The process of any of paragraphs 1-16 wherein the thermoplastic polymer has a branching index (g') of about 0.5 to about 0.99.
18. The process of any of paragraphs 1-17 wherein the thermoplastic polymer is a copolymer of propylene and about 0.01 to about 5 weight % comonomer, a melting point between about 100 and about 170° C., and an melt flow rate of about 200 dg/min or less.
19. The process of any of paragraphs 1-18 wherein the composition comprises about 20 to about 75 wt % of cross-linkable elastomer, based upon the weight of the elastomer and the thermoplastic polymer, with the balance of the blend made of thermoplastic polymer.
20. The process of any of paragraphs 1-19 further comprising recovering the TPV.
21. The process of paragraph 20, wherein the TPV has an oil swell of about 150% or more.
22. The process of paragraphs 20 and 21, wherein the TPV has an oil swell of about 200% or more.
23. The process of any of paragraphs 20-22, wherein the TPV has an oil swell of about 300% or more.
24. The process of any of paragraphs 20-23, wherein the TPV has a tension set of about 5 to about 75%.
25. The process of any of paragraphs 20-24, wherein the TPV has a tension set of about 10 to about 60%.
26. The process of any of paragraphs 20-25, wherein the TPV has a tension set of about 10 to about 50%.
27. The process of any of paragraphs 20-26, wherein the TPV has a 100% modulus of from about 2.0 to about 25 MPa.
28. The process of any of paragraphs 20-27, wherein the TPV has a 100% modulus of from about 2.5 to about 20 MPa.
29. The process of any of paragraphs 20-28, wherein the TPV has a 100% modulus of from about 3.0 to about 15 MPa.
30. The process of any of paragraphs 20-29, wherein the TPV has an elongation of about 150 to about 1000%.
31. The process of any of paragraphs 20-30, wherein the TPV has an elongation of about 200 to about 800%.
32. The process of any of paragraphs 20-31, wherein the TPV has an elongation of about 210 to about 550%.
33. The process of any of paragraphs 20-32 wherein the TPV comprises partially cross-linked TPV and fully cross-linked TPV.
34. The process of paragraph 33 wherein the partially cross-linked TPV is later cured.
35. The process of paragraphs 33 and 34 wherein the partially cross-linked TPV is later cured with hydrosilane.
36. The process of any of paragraphs 1-35 wherein the cross-linkable elastomer is selected from the group consisting of: EPR, ethylene propylene copolymer, vinyl norbornene (VNB), ethylidiene norbornene (ENB), butyl, a random propylene polymer, EPDM, Butyl rubber, halogenated butyl rubber, ethylene-propylene copolymers with ethylidene norbornene (ENB), ethylene-propylene copolymers with vinyl norbornene (VNB), styrene-butadiene rubber (SBR), polyisoprene (IR), nature rubber (NR), nitrile rubber (NBR), polybutadiene, polychloroprene, and combinations thereof.

37. The process of any of paragraphs 1-36 wherein the cross-linkable elastomer comprises 20 to 90 wt % partially cross-linked elastomeric polymer, based upon the weight of total polymers.

38. The process of any of paragraphs 1-37 wherein the cross-linkable elastomer has a heat of fusion less than 40 J/g.

39. The process of any of paragraphs 1-38 wherein the cure agent is selected from the following group: sulfur, sulfur donors, metal oxides, resin systems, such as phenolic resins, peroxide-based systems, hydrosilation with platinum or peroxide and the like, both with and without accelerators and co-agents.

40. The process of any of paragraphs 1-39 wherein the cure agent has an initiation temperature of about 90° C. or more.

41. The process of any of paragraphs 1-40 wherein the cure agent present at about 0.1 to about 15 phr.

42. The process of any of paragraphs 1-41 wherein the cure agent present at about 0.25 to about 10 phr.

43. The process of any of paragraphs 1-42 wherein the cure activator is selected from the group consisting of: sulfur compounds, metal oxide compounds, and any combinations thereof.

44. The process of any of paragraphs 1-43 wherein the solvent is selected from the group consisting of: toluene, xylenes, propane, butane, isobutene, pentane hexane cyclohexane, cyclopentane, heptane, octane, nonane, decane, and any combinations thereof.

45. The process of any of paragraphs 1-44 wherein the cross-linkable elastomer is cured at a temperature of at least about 90° C.

46. The process of any of paragraphs 1-45 wherein the cross-linkable elastomer is cured at a temperature of at least about 100° C.

47. The process of any of paragraphs 1-46 wherein the ratio of partially to fully cross-linked elastomer is at least about 30:70 to about 70:30.

48. The process of any of paragraphs 1-47 wherein the thermoplastic polymer has a branching index (g') of about 0.5 to about 0.98.

49. The process of any of paragraphs 1-48 further comprising recovering 75 nm-sized primary elastomer particles of uniform-size dispersed in the thermoplastic polymer; said uniform-size particles range in size from about 1 to about 10,000 nm.

50. The process of any of paragraphs 1-49 wherein the elastomer particles are further agglomerated to produce about 0.5 μm clusters.

51. The process of any of paragraphs 1-50 wherein the cross-linkable elastomer is cross-linked through a mixing procedure.

52. The process of any of paragraphs 1-51 wherein a first polymer, comprising a thermoplastic polymer or a cross-linkable elastomer, is made in first solution in a first reactor; the effluent from this first reactor is then fed into a second reactor wherein a second polymer, comprising a thermoplastic polymer or a cross-linkable elastomer, is made; then a solution containing both the first polymer and the second polymer is contacted with one or more curatives at an elevated temperature, with mixing to induce cross-linking of the cross-linkable elastomeric polymer, where at least one thermoplastic polymer and at least one cross-linkable elastomer are present in the solution comprising the first and second polymers.

53. The process of any of paragraphs 1-52 wherein the cross-linkable elastomer is discharged from a reactor as part of a first solution; the thermoplastic polymer is discharged from a reactor as part of a second solution; and the two solutions are combined.

54. The process of any of paragraphs 1-53 wherein the cross-linkable elastomer is discharged from a reactor as part of a first solution and then a second solution of the thermoplastic polymer is combined with the first solution.

55. The process of any of paragraphs 1-54 wherein the cross-linkable elastomer is discharged from a reactor as part of a first solution and then the thermoplastic polymer is dissolved into the first solution.

56. The process of any of paragraphs 1-55 wherein the thermoplastic polymer is discharged from a reactor as part of a first solution and then a second solution of the cross-linkable elastomer is combined with the first solution.

57. The process of any of paragraphs 1-56 wherein the thermoplastic polymer is discharged from a reactor as part of a first solution and then the cross-linkable elastomer is dissolved into the first solution.

58. The process of any of paragraphs 1-57 wherein the thermoplastic polymer and cross-linkable elastomer are dissolved in a solvent to form a homogenous solution.

59. The process of any of paragraphs 1-58 wherein the thermoplastic polymer is dissolved in a solvent; separately the cross-linkable elastomer is dissolved in the same or different solvent, and then the two solutions are combined.

60. A homogeneous polymer blend comprising: a continuous phase comprising a thermoplastic first polymer having a crystallinity of at least 30%; and a dispersed phase comprising particles of a second polymer different from the first polymer dispersed in said continuous phase, the second polymer having a crystallinity of less than 20% and being at least partially cross-linked, and the average particle size of the particles of the second polymer being less than 1 micron; and wherein the blend has an oil swell of at least 150%.

61. The blend of paragraph 60 wherein the thermoplastic first polymer is selected from the group consisting of: polypropylene, propylene ethylene copolymer, nylon, polystyrene, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, and combinations thereof.

62. The blend of paragraphs 60 and 61 wherein the ratio of thermoplastic first polymer to second polymer in Composition A is from about 20:80 to about 80:20.

63. The blend of any of paragraphs 60-62 wherein blend is mixed at a temperature of at least about 80° C.

64. The blend of any of paragraphs 60-63 wherein the second polymer is cured at a temperature of at least about 80° C.

65. The blend of any of paragraphs 60-64 wherein the blend comprises 10 to 80 wt % thermoplastic first polymer, based upon the weight of the composition.

66. The blend of any of paragraphs 60-65 wherein the thermoplastic first polymer has an Mw of 50,000 to 1,000,000 g/mol.

67. The blend of any of paragraphs 60-66 wherein the thermoplastic first polymer has an Mw/Mn of 1 to 40.

68. The blend of any of paragraphs 60-67 wherein the thermoplastic first polymer has a Tm (second melt) of 100 to 200° C.

69. The blend of any of paragraphs 60-68 wherein the thermoplastic first polymer has a glass transition temperature (Tg) of −40° C. to 200° C.

70. The blend of any of paragraphs 60-69 wherein the thermoplastic first polymer has a heat of fusion (ΔHf) of about 180 J/g or less.

71. The blend of any of paragraphs 60-70 wherein the thermoplastic first polymer has a heat of fusion ($\Delta$Hf) of about 20 to about 150 J/g.
72. The blend of any of paragraphs 60-71 wherein the thermoplastic first polymer has a heat of fusion ($\Delta$Hf) of about 40 to about 120 J/g.
73. The blend of any of paragraphs 60-72 wherein the thermoplastic first polymer has a crystallization temperature (Tc) of about 15 to about 120° C.
74. The blend of any of paragraphs 60-73 wherein the thermoplastic first polymer has a heat deflection temperature of about 45 to 150° C.
75. The blend of any of paragraphs 60-74 wherein the thermoplastic first polymer has a percent crystallinity of at least about 30%.
76. The blend of any of paragraphs 60-75 wherein the thermoplastic first polymer has a branching index (g') of about 0.5 to about 0.99.
77. The blend of any of paragraphs 60-76 wherein the thermoplastic first polymer is a copolymer of propylene and about 0.01 to about 5 weight % comonomer, a melting point between about 100 and about 170° C., and an melt flow rate of about 200 dg/min or less.
78. The blend of any of paragraphs 60-77 wherein the composition comprises about 20 to about 75 wt % of second polymer, based upon the weight of the second polymer and the thermoplastic first polymer, with the balance of the blend made of thermoplastic first polymer.
79. The blend of any of paragraphs 60-78 further comprising recovering a TPV.
80. The blend of paragraph 79, wherein the TPV has an oil swell of about 150% or more.
81. The blend of paragraphs 79 and 80, wherein the TPV has an oil swell of about 200% or more.
82. The blend of any of paragraphs 79-81, wherein the TPV has an oil swell of about 300% or more.
83. The blend of any of paragraphs 79-82, wherein the TPV has a tension set of about 5 to about 75%.
84. The blend of any of paragraphs 79-83, wherein the TPV has a tension set of about 10 to about 60%.
85. The blend of any of paragraphs 79-84, wherein the TPV has a tension set of about 10 to about 50%.
86. The blend of any of paragraphs 79-85, wherein the TPV has a 100% modulus of from about 2.0 to about 25 MPa.
87. The blend of any of paragraphs 79-86, wherein the TPV has a 100% modulus of from about 2.5 to about 20 MPa.
88. The blend of any of paragraphs 79-87, wherein the TPV has a 100% modulus of from about 3.0 to about 15 MPa.
89. The blend of any of paragraphs 79-88, wherein the TPV has an elongation of about 150 to about 1000%.
90. The blend of any of paragraphs 79-89, wherein the TPV has an elongation of about 200 to about 800%.
91. The blend of any of paragraphs 79-90, wherein the TPV has an elongation of about 210 to about 550%.
92. The blend of any of paragraphs 79-91 wherein the TPV comprises partially cross-linked TPV and fully cross-linked TPV.
93. The process of paragraph 92 wherein the partially cross-linked TPV is later cured.
94. The process of paragraphs 92 and 93 wherein the partially cross-linked TPV is later cured with hydrosilane.
95. The blend of any of paragraphs 60-94 wherein the second polymer is selected from the group consisting of ethylene-propylene rubber (EPR), ethylene propylene copolymer, vinyl norbornene (VNB), ethylidiene norbornene (ENB), butyl, a random propylene polymer, EPDM, Butyl rubber, halogenated butyl rubber, ethylene-propylene copolymers with ethylidene norbornene (ENB), ethylene-propylene copolymers with vinyl norbornene (VNB), styrene-butadiene rubber (SBR), polyisoprene (IR), nature rubber (NR), nitrile rubber (NBR), polybutadiene, polychloroprene, and combinations thereof.
96. The blend of any of paragraphs 60-95 wherein the second polymer comprises 20 to 90 wt % partially cross-linked elastomeric polymer, based upon the weight of total polymers.
97. The blend of any of paragraphs 60-96 wherein the second polymer has a heat of fusion less than 40 J/g.
98. The blend of any of paragraphs 60-97 wherein the blend further comprises cure agent selected from the group consisting of: sulfur, sulfur donors, metal oxides, resin systems, such as phenolic resins, peroxide-based systems, hydrosilation with platinum or peroxide and the like, both with and without accelerators and co-agents.
99. The blend of any of paragraphs 60-98 further comprising cure agent and wherein the cure agent those has an initiation temperature of about 90° C. or more.
100. The blend of paragraph 99 wherein the cure agent is present at about 0.1 to about 15 phr.
101. The blend of paragraphs 99 and 100 wherein the cure agent is present at about 0.25 to about 10 phr.
102. The blend of any of paragraphs 60-101 further comprising cure activator selected from the group consisting of: sulfur compounds, metal oxide compounds, and any combinations thereof.
103. The blend of any of paragraphs 60-102 further comprising solvent selected from the group consisting of: toluene, xylenes, propane, butane, isobutene, pentane hexane cyclohexane, cyclopentane, heptane, octane, nonane, decane, and any combinations thereof.
104. The blend of any of paragraphs 60-103 wherein the second polymer is cured at a temperature of at least about 90° C.
105. The blend of any of paragraphs 60-104 wherein the second polymer is cured at a temperature of at least about 100° C.
106. The blend of any of paragraphs 60-105 wherein the ratio of partially to fully cross-linked elastomer in the second polymer is at least about 30:70 to about 70:30.
107. The blend of any of paragraphs 1-106 the ratio of partially to fully cross-linked elastomer in the second polymer is at least about 30:70 to about 70:30.
108. The blend of any of paragraphs 60-107 where blend comprises 75 nm-sized primary second polymer particles of uniform-size dispersed in the thermoplastic first polymer; said uniform-size particles range in size from about 1 to about 10,000 nm.
109. The blend of any of paragraphs 1-108 wherein the second polymer particles are further agglomerated to produce about 0.5 μm clusters.
110. The blend of any of paragraphs 60-109 wherein the second polymer is cross-linked through a mixing procedure.
111. The blend of any of paragraphs 60-110 wherein the blend is formed into an article.
112. The blend of paragraph 111 where the article is selected from the group consisting of: cookware, storageware, toys, medical devices, sterilization containers, sheets, crates, containers, packaging, wire and cable jacketing, pipes, geomembranes, sporting equipment, chair mats, tubing, profiles, instrumentation sample holders, sample windows, outdoor furniture, playground equipment, automotive, boat and water craft components.
113. The blend of paragraphs 111 and 112 where the article is selected from the group consisting of: bumpers, grills, trim parts, dashboards, instrument panels, exterior door and hood components, spoiler, wind screen, hub caps, mirror housing, body panel, and protective side molding.

114. The process of any of paragraphs 20-35 and 79-94, wherein the TPV has an oil swell of about 300% or less.
115. The process of any of paragraphs 20-35 and 79-94, wherein the TPV has an oil swell of about 200% or less.
116. The process of any of paragraphs 20-35 and 79-94, wherein the TPV has an oil swell of about 100% or less.
117. The process of any of paragraphs 1-116 wherein the thermoplastic polymer has a branching index (g') of about 0.5 to about 0.98.
118. A homogeneous polymer blend comprising: a continuous phase comprising a thermoplastic first polymer having a crystallinity of at least 30%; and a dispersed phase comprising particles of a second polymer different from the first polymer dispersed in said continuous phase, the second polymer having a crystallinity of less than 20% and being at least partially cross-linked, and the average particle size of the particles of the second polymer being less than 1 micron; and wherein the blend has an oil swell of less than 300%.
119. The blend of paragraph 118 wherein the thermoplastic first polymer has a branching index (g') of about 0.5 to about 0.98.
120. The blend of paragraphs 118 or 119, wherein the TPV has an oil swell of about 300% or less.
121. The blend of any of paragraphs 118-120, wherein the TPV has an oil swell of about 200% or less.
122. The blend of any of paragraphs 118-121, wherein the TPV has an oil swell of about 150% or less.

EXAMPLES

The thermoplastic polymers and cross-linkable elastomeric polymers were dissolved in a hydrocarbon solvent to form a homogeneous solution. Curatives were added at elevated temperature with mixing to induce cross-linking of elastomer.

Materials Used

| Material | Description | Commercial Source |
| --- | --- | --- |
| | Isotactic polypropylene (iPP) | ExxonMobil Chemical Company (Houston, TX) |
| Santoprene ™ 201-73A | TPV raw materials PP:EPDM:oil = 21:34:45 | Advanced Elastomer Systems (Akron, OH) |
| Santoprene ™ 203-40D | TPV raw materials PP:EPDM:oil = 49:22:29 | Advanced Elastomer Systems (Akron, OH) |
| Vistalon 7500 | Non oil extended rubber | ExxonMobil Chemical Company (Houston, TX) |
| Vistalon 2504 Vistalon 7000 | EPDM | ExxonMobil Chemical Company (Houston, TX) |
| Toluene | $C_6H_5CH_3$ | Aldrich Chemical (Milwaukee, WI) |
| Hexane | $C_6H_{14}$ | Aldrich Chemical (Milwaukee, WI) |
| Kadox 911 | Zinc Oxide (ZnO) | The Cary Company (Addison, IL) |
| Stannous Chloride | $SnCl_2$ | Aldrich Chemical (Milwaukee, WI) |
| SP-1045 Resin | Phenolic resin oil | Schenectady International, Inc. (Schenectady, NY) |
| Stannous Chloride Dihydrate | $SnCl_2 \cdot 2H_2O$ | Aldrich Chemical (Milwaukee, WI) |
| SP1056F | brominated alkyl phenol formaldehyde resin | Schenectady International, Inc. (Schenectady, NY) |
| Equistar F008F | Polypropylene | Lyondell Chemical Company (Houston, TX) |
| Sunpar 150M oil #1 Sunpar 150M oil #2 | Paraffinic oil | Sun Oil Company (Belgium) |
| zinc oxide (HRJ 15184) | Zn Salt | Schenectady International, Inc. (Schenectady, NY) |

Test Methods

Peak melting point (Tm), crystallization temperature (Tc), heat of fusion and crystallinity were determined using the following procedure. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the curves were measured and used to determine the heat of fusion and the degree of crystallinity. A value of 189 J/g was used as the heat of fusion for 100% crystalline polypropylene. The percent crystallinity is calculated using the formula, [area under the curve (Joules/gram)/B (Joules/gram)]*100, where B is the heat of fusion for the homopolymer of the major monomer component. The values for B are to be obtained from the *Polymer Handbook, Fourth Edition*, published by John Wiley and Sons, New York 1999. (A value of 189 J/g is to be used as the heat of fusion for 100% crystalline polypropylene and a value of 290 J/g is to be used as the heat of fusion for 100% crystalline polyethylene.)

The morphology of the blends was tested using scanning electron microscopy (SEM) and atomic force microscopy (AFM). Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was about 4 N/m with a resonance frequency of about 70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

AFM phase images of all specimens were converted into a TIFF format and processed using PHOTOSHOP (Adobe Systems, Inc.). The image processing tool kit (Reindeer Games, Inc.) was applied for image measurements. Results of image measurements were written into a text file for subsequent data processing using EXCEL (Microsoft) or MATLAB (MathWorks, Inc.) for computing sizes/shapes of dispersed phases, co-continuity factor of co-continuous phases, or nearest-neighbor inter-particle distances.

Dynamic Mechanical Thermal Analysis (DMTA) was used to calculate the glass transition temperature of the composition. The solid state linear viscoelastic properties were measured using a Rheometrics Solids Analyzer equipped with a dual cantilever test fixture. The specimen was subjected to an oscillatory deformation at 0.1% strain and a frequency of 1 radian per second. The elastic modulus was calculated from the in-phase material response measured at −10° C.

| Property | Units | Test Method |
|---|---|---|
| Hardness | Shore A, D | ASTM D-2240 |
| Ultimate Tensile Strength | MPa | ASTM D-412 |
| Ultimate Elongation | % | Kingston Testing Machine (Examples 5 and 6) and an Instron Testing Machine at 23° C. (Examples 1-4) |
| 100% Modulus | MPa | |
| Compression Set | %, 22 hrs @70° C. | ISO 815A |
| Tension Set | % | ISO 2285 |

Oil swell (oil gain) was determined after soaking a die-cut sample from compression molded plaque in IRM No. 3 fluid for 24 hours at 125° C. according to ASTM D-471.

Product viscosity was measured using a LCR (Laboratory Capillary Rheometer) according to ASTM D-3835-02. The viscosity was measured using a Dynisco Capillary rheometer at 30:1 L/D (length/diameter) ratio, a shear rate of 1200 l/s and a temperature of 204° C. The entrance angle of the laboratory capillary rheometer was 180°, barrel diameter was 9.55 mm. The heat soak time was 6 minutes.

In order to measure the physical properties of the polymer blends, samples were first mixed in a Brabender melt mixer with about 45 mL mixing head. The polymer was stabilized with antioxidant during mixing in the Brabender. The Brabender was operated at 100 rpm and at a temperature of 180° C. Mixing time at that temperature was 5-10 minutes, after which the sample was removed from the mixing chamber. The homogenized samples were molded under compression into film on a Carver hydraulic press (commercially available from Carver, Inc., Wabash, Ind., USA) for analysis. About 7 grams of the homogenized polymer were molded between brass platens lined with Teflon™ coated aluminum foil. A 0.033 inch (0.08 cm) thick chase with a square opening 4 inch×4 inch (10.2×10.2 cm) was used to control sample thickness. After preheating at about 170° C. to about 180° C., the hydraulic load was increased to about 4500 to about 6800 kilograms (about 10,000 to 15,000 lbs) and held for 30 seconds. Subsequently the sample and molding plates were taken out of the compressor and cooled. Plaques were allowed to equilibrate at room temperature (about 23° C.) for a minimum of 24 hours prior to physical property testing.

Example 1

In this example, 100 g of EPDM was dissolved in 1500 mL of toluene to make a stock solution of EPDM. An autoclave reactor (0.5 L) was charged with 300 mL of the above EPDM solution, 10 g of isotactic polypropylene, 0.4 g of zinc oxide (ZnO) and 0.4 g of stannous chloride ($SnCl_2$). The reactor was purged with nitrogen and pressured with 0.55 MPa (about 80 psi) of nitrogen. The reactor was heated to 180° C. with stirring. After 5 minutes at 180° C., a toluene solution of 2.5 g phenolic resin in 10 mL of toluene was injected into the reactor. The reactor temperature was raised to 200° C., and the reaction was continued at 200° C. for 15 minutes. After 15 minutes, the reactor was cooled to ambient temperature and vented. The resulting polymer was precipitated by addition of 500 mL of isopropanol, washed with 200 mL of isopropanol, and dried in a vacuum oven at 60° C. for 16 hours.

Example 2

In this Example, 100 g of EPDM was dissolved in 1500 mL of hexane to make a stock solution of EPDM. A autoclave reactor (0.5 L) was charged with 300 mL of the above EPDM solution, 15 g of isotactic polypropylene, 0.4 g of zinc oxide (ZnO) and 0.5 g of stannous chloride dihydrate ($SnCl_2 \cdot 2H_2O$). The reactor was purged with nitrogen and pressured with 0.55 MPa (about 80 psi) of nitrogen. The reactor was heated to 180° C. with stirring. After 5 minutes at 180° C., a toluene solution of 2.5 g phenolic resin in 7.5 mL of hexane was injected into the reactor. The reactor temperature was raised to 200° C., and the reaction was continued at 200° C. for 20 minutes. After 20 minutes, the reactor was cooled to ambient temperature and vented. The resulting polymer was precipitated by addition of 500 mL of isopropanol, washed with 200 mL of isopropanol, and dried in a vacuum oven at 80° C. for 16 hours.

Example 3

In this Example, 100 g of EPDM was dissolved in 1500 mL of hexane to make a stock solution of EPDM. A autoclave reactor (0.5 L) was charged with 300 mL of the above EPDM solution, 15 g of the isotactic polypropylene, 0.4 g of zinc oxide (ZnO) and 0.5 g of stannous chloride dihydrate ($SnCl_2 \cdot 2H_2O$). The reactor was purged with nitrogen and pressured with 0.55 MPa (about 80 psi) of nitrogen. The reactor was heated to 180° C. with stirring. After 5 minutes at 180° C., a toluene solution of 4.0 g phenolic resin in 6.0 mL of hexane was injected into the reactor, and the reaction was continued at 180° C. for 15 minutes. After 15 minutes, the reactor was cooled to ambient temperature and vented. The resulting polymer was precipitated by addition of 500 mL of isopropanol, washed with 200 mL of isopropanol, and dried in a vacuum oven at 60° C. for 16 hours.

Samples from Examples 1-3 were homogenized by melt mixing 43 g on a Brabender at 180° C. and 100 rpm to obtain samples 1A, 2A, & 3A, respectively. In a separate experiment 30.07 g of the samples 1, 2, 3 were compounded with 12.93 g of paraffinic oil on a Brabender at 180° C. and 100 rpm to obtain samples 1B, 2B, & 3B, respectively. The physical and mechanical properties were characterized by standard TPV test methods and results are listed on the table below.

TABLE 1

| Sample | Example 1A | Example 2A | Example 3A | Example 1B | Example 2B | Example 3B |
|---|---|---|---|---|---|---|
| Composition | | | | | | |
| Example 1 (g) | 43.00 | | | 30.07 | | |
| Example 2 (g) | | 43.00 | | | 30.07 | |

TABLE 1-continued

| Sample | Example 1A | Example 2A | Example 3A | Example 1B | Example 2B | Example 3B |
|---|---|---|---|---|---|---|
| Example 3 (g) | | | 43.00 | | | 30.07 |
| Sunpar 150M Oil (g) | | | | 12.93 | 12.93 | 12.93 |
| Total (g) | 43.00 | 43.00 | 43.00 | 43.00 | 43.00 | 43.00 |
| Properties | | | | | | |
| Tm (° C.) | 152.40 | 152.68 | 151.85 | | | |
| ΔHf (J/g) | 31.53 | 42.71 | 42.30 | | | |
| Hardness (A) | 87 | 89 | 93 | 76 | 78 | 76 |
| UTS (MPa/psi) | 12/1745 | 9.6/1398 | 14.6/2119 | 5.7/822 | 4.2/609 | 6.0/876 |
| Elongation (%) | 522 | 415 | 425 | 330 | 212 | 286 |
| 100% Modulus (MPa/psi) | 6.3/907 | 7.5/1087 | 10.0/1441 | 10.8/561 | 3.7/540 | 3.9/560 |
| Tension Set (%) | 25.75 | 41.00 | 52.00 | 25.00 | 31.50 | 16.75 |
| LCR | 302 | 252.8 | 248.5 | 120.9 | 104 | 119.3 |
| Oil Swell (%) | 319.01 | 291.07 | 205.47 | 174.44 | 198.59 | 147.50 |
| Comp. Set (%) | 62.56 | 78.06 | 67.73 | 62.76 | 67.82 | 36.67 |

Example 4

Preparation of Polymer Blend A

A homogeneous blend of EPDM rubber and polypropylene was prepared by dissolving the two components in a solvent of xylene at 115° C. Accordingly, 100 parts of EPDM rubber (V7500 from ExxonMobil Chemical Co., Houston, Tex., USA) and 223.9 parts of polypropylene (Equistar F008F, Lyondell Chemical Company, Houston, Tex.) were dissolved in 1500 mL of xylene (from Fisher Scientific Inc., Hampton, N.H., USA) at 115° C. in a round bottom flask. The mixture was stirred using a mechanical stirrer for about 24 hours until both components were totally dissolved to form a homogeneous solution. The solution of the polymer blend was then poured slowly into about 2000 mL of ethanol to precipitate the polymer blend. The precipitated blend was filtered and dried in vacuum oven for about 48 hours. The dried solution blend was compression molded to plaques to test the physical properties and data are listed in Table 2 (Example 4).

Examples 5 and 6

Preparation of Polymer Blend B

A homogeneous blend of EPDM rubber, polypropylene, rubber cure agent and accelerators was prepared by dissolving and mixing these components in a solvent of xylene at 115° C. Accordingly, 100 parts of EPDM rubber (V7500 from ExxonMobil Chemical Co., Houston, Tex., USA) and 223.9 parts of polypropylene (Equistar F008F, Lyondell Chemical Company, Houston, Tex.) were dissolved in 1500 mL of xylene at 115° C. in a round bottom flask. The mixture was stirred using a mechanical stirrer for about 24 hours until both components were totally dissolved to form a homogeneous solution. The curing agent phenolic resin (6 parts, SP1045 from Schenectady International, Schenectady, N.Y.) and curing accelerators anhydrous stannous chloride (1.2 parts) and Zinc oxide (2 parts), were then added and stirred for about 15 minutes. The polymer solution with cure system was then poured slowly into about 2000 mL of ethanol to precipitate the polymer blend. The precipitated blend was filtered and dried in vacuum oven for about 48 hours.

Preparation of Polymer Blend C

A homogeneous blend of EPDM rubber, polypropylene, rubber cure agent and accelerators was prepared by dissolving and mixing these components in a solvent of xylene at 115° C. Accordingly, 100 parts of EPDM rubber (V7500 from ExxonMobil Chemical Co., Houston, Tex., USA) and 223.9 parts of polypropylene (Equistar F008F, Lyondell Chemical Company, Houston, Tex.) were dissolved in 1500 mL of xylene at 115° C. in a round bottom flask. The mixture was stirred using a mechanical stirrer for about 24 hours until both components were totally dissolved in the solvent xylene to form a homogeneous solution. The curing agent is a brominated phenolic resin (6 parts, SP1056F from Schenectady International. Schenectady, N.Y., USA) and curing accelerator zinc donor (2 parts, HRJ 15184 from Schenectady International. Schenectady, N.Y., USA) were then added and stirred for about 15 minutes. The solution of the polymer blend with cure system was then poured slowly into about 2000 mL of ethanol to precipitate the polymer blend. The precipitated blend was filtered and dried in vacuum oven for about 48 hours.

Preparation of Thermoplastic Vulcanizates by Static Curing of EPDM-PP Blends with Dispersed Cure Agents Polymer blend B and C were statically cured by compression molding the dried polymer blends on Wabash Hot press. The dried polymer blend was placed in a 12.7 cm by 12.7 cm (about 5 inches by 5 inches) mold and pressed in between two metallic plates on a Wabash press at 180° C. for 15 minutes. The dispersed cure agents were activated at 180° C. and cross-linked the rubber phase of the blend. The cured molded plaques were tested for physical properties. The sample from blend B is labeled as Example 5, and the sample from blend C is labeled as Example 6.

Example 7

Preparation of Thermoplastic Vulcanizates by Room Temperature Curing of EPDM-PP Blends Using $SCl_2$ Vapor About 18 mL of solution of $SCl_2$ (1 M in $CH_2Cl_2$) was placed in a glass dish. The glass dish with $SCl_2$ solution was then placed in the bottom level of a desiccator. A perforated porcelain disc was placed over the dish containing $SCl_2$ solution. About 42 g of the dried polymer blend A was placed on the perforated porcelain disc inside the desiccator. The lid of the desiccator was closed and a vacuum was applied for overnight by connecting the desiccator to a lab vacuum unit. The desiccator with the polymer blend and $SCl_2$ was set in laboratory hood. The polymer was left in the desiccator for another 4 hrs after being disconnected from the lab vacuum unit. The cured polymer blend was then melt pressed at 190° C. to form plaques and was tested for properties. The sample is labeled as Example 7.

Example 8

A comparative thermoplastic vulcanizate was prepared on a Brabender by dynamic vulcanization. The vulcanization was effected by conventional techniques. 100 parts of EPDM rubber (V7500 from ExxonMobil Chemical Co., Houston, Tex., USA) and 223.9 part of polypropylene (Equistar F008F, Lyondell Chemical Company, Houston, Tex.) were melt mixed in a Brabender along with the curing agent phenolic resin (6 parts, SP1045 from Schenectady International. Schenectady, N.Y., USA) and curing accelerators anhydrous stannous chloride (1.2 parts, $SnCl_2$ from Mason Corp., U.S. Route 41, Schererville, Ind., USA) and Zinc oxide (2 parts). The vulcanized blend was compression molded to plaques and tested for physical properties. The sample is labeled as Example 8.

As compared to the standard melt blend TPV properties, some improvement was observed (i.e., ultimate tensile strength (MPa/psi), ultimate elongation (%)). The hardness, compression set (CS) (%), values were comparable to the melt blend method of preparation. Uncured blends prepared in solution showed improved elastomeric properties.

Examples 9-13

Describe the In-Situ Synthesis of PP/EPDM Blends for Solution Curing

General Synthesis:

Polymerization grade ethylene and propylene were supplied directly from the ExxonMobil Chemical Plant and purified by passing through activated basic alumina and molecular sieves. Polymerization was conducted in a 2-liter autoclave reactor. The reactor was charged with toluene (500 mL), propylene (400 mL) and tri-t-butylaluminum (3.0 mL of 1M solution in hexane). The reactor was heated to 70° C., and contents were stirred at 200 RPM. The catalyst, (rac-Dimethylsilandiyl bis(2-methyl-4-phenylindenyl) zirconium dimethyl activated by dimethyl anilinium tetrakis(prefluoronaphthyl)borate (0.35 mg) pre-loaded in a catalyst tube) was injected with propylene (300 mL). The polymerization was kept at 70° C. for 5 min. Air (4 mL) and toluene (120 mL) were injected into the reactor. After 10 min, the reactor was charged with ethylene (400 psig) and vinylnorbonene (4 mL). The catalyst (activated by dimethyl anilinium tetrakis(prefluoronaphthyl)borate (0.8 mg pre-loaded in a catalyst tube) was injected with toluene (100 mL), the reactor was pressurized to 510 psig with ethylene. The polymerization was kept at 70° C. for 25 min and was then stopped by cooling the reactor to 25° C. The reactor was vented, and the polymer was precipitated by addition of methanol, collected by filtration, and dried in a vacuum oven at 80° C. for 12 hours.

TABLE 2

| | Example | | | | |
|---|---|---|---|---|---|
| | Example 4 | Example 5 | Example 6 Material | Example 7 | Example 8 |
| | Polymer Blend A | Polymer Blend B | Polymer Blend C | Polymer Blend A | Comparative TPV |
| Vistalon 7500 | 100 | 100 | 100 | 100 | 100 |
| SP1056F | | | 6 | | |
| $SCl_2$ (1.0M in $CH_2Cl_2$) | | | | | |
| HRJ 15184 (Zn salt) | | | 2 | | |
| Kadox 911 ZnO | | 2 | | | 2 |
| $SnCl_2$ | | 1.26 | | | 1.26 |
| Equistar F008F | 223.9 | 223.9 | 223.9 | 223.9 | 223.9 |
| SP1045 Resin | | 6 | | | 6 |
| Total PHR | 323.9 | 333.16 | 331.9 | 323.9 | 333.16 |
| Test Results Material | Example 4 | Example 5 | Example 6 | Example 7 | Example 8 |
| Hardness (shore D) | 56 | 55 | 58 | 59 | 58 |
| UTS (MPa/psi) | 14.32/2077 | 14.02/2034 | 16.68/2419 | 28.11/4077 | 20.98/3043 |
| Elongation (%) | 192 | 163 | 534 | 360 | 144 |
| 100% Mod. (MPa/psi) | 14.94/2167 | 14.35/2081 | 13.61/1974 | 16.77/2433 | 20.34/2950 |
| Tension Set (%) | Broke | Broke | 71.00% | 43% | 93% |
| LCR/Product Viscosity | 210.4 | 230.7 | 248.1 | 359.7 | 290.6 |
| Oil Swell, % (24 hrs@121° C.) | 128% | 123% | 128% | 69% | 63% |
| Compression Set, (%) (22 hrs@70° C.) | 82 | 91 | 76 | 56 | 69 |

TABLE 3

| Composition by DSC | Sample ID | | | | |
| --- | --- | --- | --- | --- | --- |
| | Example 9 | Example 10 | Example 11 | Example 12 | Example 13 |
| PP (wt %) | 53 | 39 | 15 | 74 | 46 |
| EPDM (wt %) | 47 | 61 | 85 | 26 | 54 |
| Tm (° C.) | 157 | 160 | 159 | 154 | 154 |
| ΔH$_f$(J/g) | 51 | 39 | 15 | 73 | 46 |
| Tc (° C.) | 110 | 113 | 117 | 104 | 109 |
| Tg (° C.) | −44 | −38 | −35 | −50 | −22 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A homogeneous polymer blend comprising: a continuous phase comprising a thermoplastic first polymer having a crystallinity of at least 30%; and a dispersed phase comprising particles of a second polymer different from the first polymer dispersed in said continuous phase, the second polymer having a crystallinity of less than 20% and being at least partially cross-linked, and the average particle size of the particles of the second polymer being less than 1 micron; and wherein the blend has an oil swell of at least 150%.

2. The blend of claim 1 wherein the thermoplastic first polymer is selected from the group consisting of: polypropylene, propylene ethylene copolymer, nylon, polystyrene, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, and combinations thereof.

3. The blend of claim 1 wherein the ratio of thermoplastic first polymer to second polymer in Composition A is from about 20:80 to about 80:20.

4. The blend of claim 1 wherein the thermoplastic first polymer has an Mw of 50,000 to 1,000,000 g/mol.

5. The blend of claim 1 wherein the thermoplastic first polymer has an Mw/Mn of 1 to 40.

6. The blend of claim 1 wherein the thermoplastic first polymer has a Tm (second melt) of 100 to 200° C.

7. The blend of claim 1 wherein the thermoplastic first polymer has a glass transition temperature (Tg) of −40° C. to 200° C.

8. The blend of claim 1 wherein the thermoplastic first polymer has a heat of fusion (Δ Hf) of about 180 J/g or less.

9. The blend of claim 1 wherein the thermoplastic first polymer has a crystallization temperature (Tc) of about 15 to about 120° C.

10. The blend of claim 1 wherein the thermoplastic first polymer has a heat deflection temperature of about 45 to 150° C.

11. The blend of claim 1 wherein the thermoplastic first polymer has a percent crystallinity of at least about 30%.

12. The blend of claim 1 wherein the thermoplastic first polymer has a branching index (g') of about 0.5 to about 0.99.

13. The blend of claim 1 wherein the thermoplastic first polymer is a copolymer of propylene and about 0.01 to about 5 weight % comonomer, a melting point between about 100 and about 170° C., and an melt flow rate of about 200 dg/min or less.

14. The blend of claim 1 wherein the composition comprises about 20 to about 75 wt % of second polymer, based upon the weight of the second polymer and the thermoplastic first polymer, with the balance of the blend made of thermoplastic first polymer.

15. The blend of claim 1 wherein the second polymer is selected from the group consisting of ethylene-propylene rubber (EPR), ethylene propylene copolymer, vinyl norbornene (VNB), ethylidiene norbornene (ENB), butyl, a random propylene polymer, EPDM, Butyl rubber, halogenated butyl rubber, ethylene-propylene copolymers with ethylidene norbornene (ENB), ethylene-propylene copolymers with vinyl norbornene (VNB), styrene-butadiene rubber (SBR), polyisoprene (IR), nature rubber (NR), nitrile rubber (NBR), polybutadiene, polychloroprene, and combinations thereof.

16. The blend of claim 1 wherein the ratio of partially to fully cross-linked elastomer in the second polymer is at least about 30:70 to about 70:30.

17. The blend of claim 1 wherein the blend is formed into an article.

18. The blend of claim 17 where the article is selected from the group consisting of: cookware, storageware, toys, medical devices, sterilization containers, sheets, crates, containers, packaging, wire and cable jacketing, pipes, geomembranes, sporting equipment, chair mats, tubing, profiles, instrumentation sample holders, sample windows, outdoor furniture, playground equipment, automotive, boat and water craft components.

19. The blend of claim 17 where the article is selected from the group consisting of: bumpers, grills, trim parts, dashboards, instrument panels, exterior door and hood components, spoiler, wind screen, hub caps, mirror housing, body panel, and protective side molding.

20. A homogeneous polymer blend comprising: a continuous phase comprising a thermoplastic first polymer having a crystallinity of at least 30%; and a dispersed phase comprising particles of a second polymer different from the first polymer dispersed in said continuous phase, the second polymer having a crystallinity of less than 20% and being at least partially cross-linked, and the average particle size of the particles of the second polymer being less than 1 micron; and wherein the blend has an oil swell of less than 300%.

* * * * *